United States Patent
Morita et al.

(10) Patent No.: US 7,472,697 B2
(45) Date of Patent: Jan. 6, 2009

(54) AIR-FUEL RATIO CONTROL APPARATUS

(75) Inventors: Hiroshi Morita, Obu (JP); Kazuto Ikeda, Takahama (JP)

(73) Assignees: Toyota Jidosha Kabushiki Kaisha, Toyota (JP); Denso Corporation, Kariya (JP)

(*) Notice: Subject to any disclaimer, the term of this patent is extended or adjusted under 35 U.S.C. 154(b) by 0 days.

(21) Appl. No.: 11/604,196

(22) Filed: Nov. 27, 2006

(65) Prior Publication Data

US 2007/0125350 A1 Jun. 7, 2007

(30) Foreign Application Priority Data

Dec. 5, 2005 (JP) ............... 2005-350560

(51) Int. Cl.
F02D 41/00 (2006.01)
F01L 1/34 (2006.01)
G06F 17/00 (2006.01)

(52) U.S. Cl. ............. 123/679; 123/90.15; 60/276; 701/109

(58) Field of Classification Search ......... 123/674, 123/676, 679, 90.15, 90.27; 701/103, 108, 701/109, 115; 60/274, 276, 285
See application file for complete search history.

(56) References Cited

U.S. PATENT DOCUMENTS

| | | | | |
|---|---|---|---|---|
| 5,379,587 A * | 1/1995 | Toyoda | | 60/276 |
| 5,400,592 A * | 3/1995 | Mukaihira et al. | | 60/274 |
| 5,557,933 A * | 9/1996 | Numata et al. | | 60/274 |
| 5,797,261 A * | 8/1998 | Akazaki et al. | | 60/276 |
| 5,875,628 A * | 3/1999 | Mitsutani | | 60/276 |
| 6,233,927 B1 * | 5/2001 | Hirota et al. | | 60/297 |
| 6,481,201 B2 * | 11/2002 | Kako et al. | | 60/285 |
| 6,694,726 B2 * | 2/2004 | Sakai | | 60/277 |
| 6,732,503 B2 * | 5/2004 | Harima et al. | | 60/276 |

(Continued)

FOREIGN PATENT DOCUMENTS

EP      1 229 230 A2     8/2002

(Continued)

OTHER PUBLICATIONS

Richard van Basshuysen et al., Handbook, "Manual Internal Combustion Engine", 2nd Edition, Wieweg, Jun. 2002, pp. 559-560.

Primary Examiner—Willis R. Wolfe, Jr.
Assistant Examiner—Johnny H. Hoang
(74) Attorney, Agent, or Firm—Oliff & Berridge PLC

(57) ABSTRACT

An air-fuel ratio control apparatus is applied to an internal combustion engine including a variable lift mechanism which changes a lift amount of an intake valve. An oxygen sensor, which outputs a signal indicating an oxygen concentration in exhaust gas, is provided downstream of an exhaust gas purification catalyst in an exhaust passage of the internal combustion engine. Air-fuel ratio control is performed to correct the fuel injection amount command value using the correction amount that is set based on the value output from the oxygen sensor. The relationship among the deviation of the correction amount from its reference value, the learned small lift value, the learned medium lift value, and the lift amount is learned. The learned deviation value is calculated based on the lift amount, using the learned relationship. Then, the fuel injection amount command value is corrected by the correction amount including the calculated learned deviation value.

19 Claims, 9 Drawing Sheets

U.S. PATENT DOCUMENTS

| | | | |
|---|---|---|---|
| 6,848,301 B2 * | 2/2005 | Kondo | 73/118.2 |
| 6,901,744 B2 * | 6/2005 | Kako et al. | 60/285 |
| 6,962,045 B2 * | 11/2005 | Kitahara et al. | 60/295 |
| 6,990,968 B2 * | 1/2006 | Nagaishi et al. | 123/672 |
| 7,159,388 B2 * | 1/2007 | Nakagawa et al. | 60/285 |
| 7,207,171 B2 * | 4/2007 | Nagaoka et al. | 60/295 |
| 7,234,435 B2 * | 6/2007 | Lewis et al. | 123/198 F |
| 7,317,984 B2 * | 1/2008 | Lewis | 701/112 |
| 7,325,393 B2 * | 2/2008 | Miura | 60/277 |
| 7,337,772 B2 * | 3/2008 | Yasui et al. | 123/697 |
| 2001/0008990 A1 * | 7/2001 | Ishii et al. | 701/109 |
| 2007/0017212 A1 * | 1/2007 | Yamauchi et al. | 60/277 |

FOREIGN PATENT DOCUMENTS

| JP | B2-6-76768 | 9/1994 |
|---|---|---|
| JP | A 2001-263015 | 9/2001 |
| JP | A 2002-303187 | 10/2002 |
| JP | A 2004-36396 | 2/2004 |

* cited by examiner

F I G . 10

| VLa≦VL<VLb | VLb≦VL<VLc | VLc≦VL<VLd | VLd≦VL |
|---|---|---|---|
| RANGE 1 | RANGE 2 | RANGE 3 | RANGE 4 |
| LEARNED VALUE Gkb1 | LEARNED VALUE Gkb2 | LEARNED VALUE Gkb3 | LEARNED VALUE Gkb4 (=0) |

AIR-FUEL RATIO CONTROL APPARATUS

INCORPORATION BY REFERENCE

The disclosure of Japanese Patent Application No. 2005-350560 filed on Dec. 5, 2005 including the specification, drawings and abstract is incorporated herein by reference in its entirety.

BACKGROUND OF THE INVENTION

1. Field of the Invention

The invention relates to an air-fuel ratio control apparatus for an internal combustion engine that includes a variable lift mechanism, which changes the lift amount of an intake value. The air-fuel ratio control apparatus also controls the air-fuel ratio based on a signal output from a sensor that detects the oxygen concentration in the exhaust gas present downstream of an exhaust gas purification catalyst.

2. Description of the Related Art

In an internal combustion engine, the exhaust gas is usually purified by an exhaust gas purification catalyst provided in an exhaust passage. The exhaust gas purification catalyst efficiently purifies the exhaust gas, when the air-fuel ratio of the air-fuel mixture, that is burned in the internal combustion engine, is within a predetermined range. Therefore, a sensor, which outputs a signal indicating the oxygen concentration in the exhaust gas, is provided upstream of the exhaust gas purification catalyst, and the actual air-fuel ratio of the air-fuel mixture is determined based on the signal output from the sensor. Then, the air-fuel ratio control is performed. In the air-fuel ratio control, the determined air-fuel ratio is compared with the target air-fuel ratio. If the determined air-fuel ratio deviates from the target air-fuel ratio, the fuel injection amount is corrected so that the actual air-fuel ratio becomes equal to the target air-fuel ratio.

Japanese Patent Application Publication No. JP-A-2004-36396 describes providing another sensor, which outputs a signal indicating the oxygen concentration in the exhaust gas, downstream of the exhaust gas purification catalyst to assess the condition of the exhaust gas purification action of the exhaust gas purification catalyst, in addition to the sensor provided upstream of the exhaust gas purification catalyst described above. Then, so-called sub-air-fuel ratio control, that is, an air-fuel ratio control that corrects the fuel injection amount based on the signal from the sensor provided downstream of the exhaust gas purification catalyst is performed.

Japanese Patent Application Publication No. JP-A-2001-263015 describes an apparatus that includes a variable lift mechanism, which adjusts the lift amount (more specifically, the maximum lift amount) of an intake valve of an internal combustion engine. With such apparatus, the operation of the variable lift mechanism is controlled so that the actual lift amount becomes equal to the target lift amount. Thus, the intake valve is opened or closed to achieve the lift amount appropriate for the current operating state of the internal combustion engine.

There is an individual difference in the lift amount of the intake value, due to an influence of, for example, a fitting error. Accordingly, the cross-sectional area of a communication portion (a part of an intake passage) in an internal combustion engine, at which an intake passage is communicated with a combustion chamber (hereinafter, such cross-sectional area will be referred to as the "passage area"), may slightly deviate from the reference passage area. Also, deposits may adhere to the intake valve with the operation of the internal combustion engine. In such a case, the passage area changes, causing the actual passage area to deviate from the reference passage area. Such deviation of the actual passage area from the reference passage area contributes to reduced accuracy in adjustment of the intake air amount, and, consequently, reduced accuracy in adjusting the air-fuel ratio of the air-fuel mixture. In the internal combustion engine where the above-described air-fuel ratio control is performed, the deviation of the actual air-fuel ratio from the reference air-fuel ratio due to the deviation of the actual passage area from the reference passage area is compensated for, basically, through the air-fuel ratio control. As a result, reduction in the accuracy in adjustment of the air-fuel ratio is avoided.

In the internal combustion engine provided with the variable lift mechanism, the deviation of the actual passage area from the reference passage area causes the actual air-fuel ratio to deviate from the reference air-fuel ratio. Such deviation of the actual air-fuel ratio from the reference air-fuel ratio varies depending on the manner in which the variable lift mechanism is operated. More specifically, operating the variable lift mechanism to reduce the lift amount of the intake valve increases the ratio of the deviation of the intake air amount from the reference value, due to the deviation of the actual passage area from the reference passage area, to the total intake air amount. Consequently, the deviation of the actual air-fuel ratio from the reference air-fuel ratio increases.

Accordingly, if the manner in which the lift amount changing mechanism is operated frequently changes so as to be appropriate for the current operating state of the internal combustion engine, the deviation of the air-fuel ratio from the reference air-fuel ratio also changes frequently. The apparatus described in Japanese Patent Application Publication No. JP-A-2004-36396 controls the air-fuel ratio based only on the signal from the sensor. With such an apparatus, if the manner in which the variable lift mechanism is operated changes so frequently, it may not be possible to accurately compensate for the deviation of the air-fuel ratio from the reference air-fuel ratio, which is frequently changed in accordance with a frequent change in the manner described above.

SUMMARY OF THE INVENTION

The invention provides an air-fuel ratio control apparatus that accurately controls the air-fuel ratio of an air-fuel mixture to a desired ratio in an internal combustion engine provided with a variable lift mechanism.

Hereafter, the configuration for achieving the above-described object and the effects thereof will be described.

An aspect of the invention relates to an air-fuel ratio control apparatus for an internal combustion engine including a variable lift mechanism that changes the lift amount of the intake valve. The air-fuel ratio control apparatus includes a first control unit that performs the air-fuel ratio control to correct the fuel injection amount command value using the correction amount that is set based on the value output from a sensor provided downstream of an exhaust gas purification catalyst in the exhaust passage of the internal combustion engine. The sensor outputs a signal indicating the oxygen concentration in the exhaust gas present downstream of the exhaust gas purification catalyst. The air-fuel ratio control apparatus also includes a second control unit that learns the relationship between the deviation of the correction amount from its reference value and the lift amount, that calculates the learned deviation value based on the lift amount, using the learned relationship, and that corrects the fuel injection amount command value using the correction amount including the calculated learned deviation value.

With this configuration, the deviation of the correction amount from the reference value is learned based on the lift amount of the intake valve, and used in the air-fuel ratio control. Accordingly, the fuel injection amount is increased or decreased by the correction amount so that the air-fuel ratio of the air-fuel mixture is adjusted to a desired air-fuel ratio, while the influence of the difference in the manner, in which the variable lift mechanism is operated, on the air-fuel ratio is suppressed by the correction using the learned deviation value. Accordingly, the air-fuel ratio of the air-fuel mixture is accurately controlled to the desired air-fuel ratio in the internal combustion engine including the variable lift mechanism.

The learned deviation value calculated using the relationship may increase as the lift amount decreases.

When the passage area of the communication portion, at which the intake passage of the internal combustion engine communicates with the combustion chamber, deviates from the reference passage area due to fitting error of the intake valve or the deposits adhering to the intake valve, the deviation of the correction amount from the reference value increases as the lift amount of the intake valve decreases. With this configuration, the learned deviation value is calculated based on such tendency.

The relationship may be learned, the learned deviation value may be calculated, and the fuel injection amount command value may be corrected using the learned deviation value, on the condition that the lift amount is smaller than a predetermined lift amount.

Even when the passage area of the communication portion deviates from the reference area, there is almost no influence of the deviation of the passage area from the reference area on the air-fuel ratio in the range where the lift amount of the intake value is large.

With this configuration, only in the range different from the above-mentioned range, in which the lift amount is relatively small, in other words, only in the range in which the deviation of the passage area from the reference area may be exerted on the air-fuel ratio, the learned deviation value is calculated and the fuel injection amount command value is corrected using the learned deviation value.

A linear function may be set as the relationship in advance, the deviation corresponding to a specific lift amount that is smaller than the predetermined lift amount may be calculated, the slope of the function may be changed based on the calculated deviation, and the relationship indicated by the function having the changed slope may be learned.

With this configuration, the linear function is set in advance, the function is changed based on the deviation corresponding to the specific lift amount, and the relationship indicated by the function having the changed slope is learned. Accordingly, in contrast with the configuration where many lift amount ranges are set, the deviations corresponding to the respective ranges are calculated, and the learned values are set to the calculated deviations, the relationship is learned at low frequency in the wide lift amount range.

The specific lift amount may be the minimum lift amount that can be realized.

With this configuration, the relationship is learned based on the deviation corresponding to the lift amount at which the influence of the deviation of the passage area of the communication portion from the reference area is most prominent. As a result, the relationship is learned accurately.

The specific lift amount may be the lift amount that is set when the internal combustion engine is at idle.

With this configuration, the relationship is learned when the internal combustion engine is at idle, that is, when the internal combustion engine is operating stably, in other words, when the deviation is stable. Accordingly, the relationship is learned accurately.

In addition to the deviation corresponding to the specific lift amount, the deviation corresponding to a lift amount different from the specific lift amount may be calculated, and the slope of the function may be changed based on the calculated deviations.

With this configuration, the relationship is learned so as to be more appropriate for the actual deviation in the wider lift amount range.

The deviations corresponding to respective two different specific lift amounts may be independently learned, and the learned deviation value may be calculated by interpolating a value between the independently learned deviations based on the relationship between the specific lift amounts and the lift amount.

With this configuration, as compared with the configuration in which many lift amount ranges are set, the deviations corresponding to the respective ranges are calculated, and the learned values are set to the calculated deviations, the relationship is learned at low frequency in the wide lift amount range.

The interpolation may be performed using a predetermined conversion coefficient. Alternatively, the interpolation may be a linear interpolation. Also, the method for the interpolation may be either interpolation or extrapolation.

Multiple ranges may be set for the lift amount, the relationship may be learned by learning the deviations corresponding to the respective ranges, one of the multiple ranges may be selected based on the lift amount, and the learned value corresponding to the selected range may be calculated as the learned deviation value.

With this configuration, when the passage area of the communication portion deviates from the reference area, the deviations corresponding to the multiple ranges having different influence of such deviation on the air-fuel ratio may be individuation learned. Then the air-fuel ratio control may be performed using the deviations.

In addition to the sensor provided downstream of the exhaust gas purification catalyst in the exhaust passage of the internal combustion engine, a sensor may also be provided upstream of the exhaust gas purification catalyst in the exhaust passage of the internal combustion engine, which outputs a signal indicating the oxygen concentration in exhaust gas present upstream of the exhaust gas purification catalyst. The air-fuel ratio control may be performed, at predetermined intervals, in which the fuel injection amount command value is corrected based on a value output from the sensor provided upstream of the exhaust gas purification catalyst, and the fuel injection amount command value is corrected by the correction amount, which is increased or decreased by a predetermined amount, based on the result of comparison between the value output from the sensor provided downstream of the exhaust gas purification catalyst and the reference value.

As described above, the fuel injection amount is corrected based on the signal output from the sensor provided upstream of the exhaust gas purification catalyst. In addition to this, there is provided the device that performs so-called sub-air-fuel ratio control, that is, corrects the fuel injection amount by the correction amount, which is increased or decreased by the predetermined amount, based on the signal output from the sensor provided downstream of the exhaust gas purification catalyst. Performing the sub-air-fuel ratio control makes it possible to adjust the fuel injection amount based on the actual exhaust gas purification action of the exhaust gas purification catalyst. As a result, the exhaust gas purification catalyst can purify the exhaust gas more efficiently. However, in the internal combustion engine including the variable lift mechanism, the deviation of the air-fuel ratio from the reference value is changed so frequently due to the frequent change in the lift amount of the intake value, it may not be possible to accurately increase or decrease the correction amount used in the sub-air-fuel ratio control.

With the configuration described above, the correction amount used in the sub-air-fuel ratio control can be accurately changed so that the change in the deviation of the air-fuel ratio from the reference value due to the change in the lift amount can be compensated for. As a result, the air-fuel ratio of the air-fuel mixture is accurately controlled to a desired ratio.

The internal combustion engine may include multiple cylinders. The sensor provided upstream of the exhaust gas purification catalyst may be shared by all the cylinders.

In the multi-cylinder internal combustion engine, variation in the air-fuel ratio of the air-fuel mixture among the cylinders cannot be avoided due to the individual difference of the fuel injection valves and deposit adhering to the intake values. When the fuel injection amount command value is corrected based on the signal output from the sensor, which is provided upstream of the exhaust gas purification catalyst and which is shared by all the cylinders, such variation contributes the reduced accuracy in adjustment of the properties of the exhaust gas present upstream of the exhaust gas purification catalyst to the properties indicative of an air-fuel ratio at or around the stoichiometric air-fuel ratio. Accordingly, in the multi-cylinder internal combustion engine, the deviation of the value output from the sensor provided downstream of the exhaust gas purification catalyst from the reference value is likely to be large, and, consequently, the deviation of the air-fuel ratio from the reference air-fuel ratio due to the change in the lift amount of the intake valve is likely to be large.

BRIEF DESCRIPTION OF THE DRAWINGS

The foregoing and further objects, features and advantages of the invention will become apparent from the following description of example embodiments with reference to the accompanying drawings, wherein the same or corresponding portions will be denoted by the same reference numerals and wherein:

FIG. 10 is a table showing the multiple ranges and the learned values corresponding to the respective ranges;

DETAILED DESCRIPTION OF THE PREFERRED EMBODIMENTS

Hereafter, a first embodiment of the invention will be described in detail.

Figure 1:
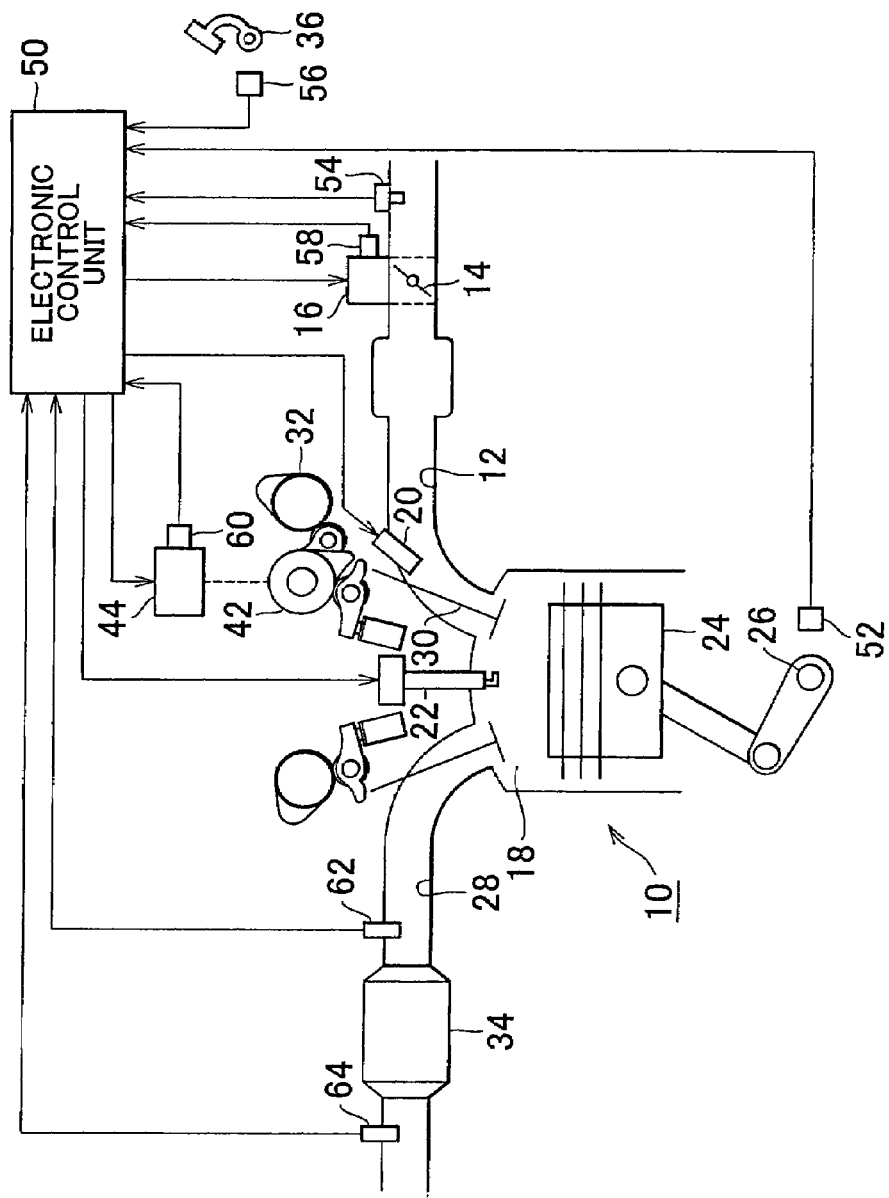
FIG. 1 is a view schematically showing an air-fuel ratio control apparatus according to a first embodiment of the invention.

FIG. 1 schematically shows an air-fuel ratio control apparatus according to the first embodiment of the invention. As shown in FIG. 1, a throttle valve 14 is provided in an intake passage 12 of an internal combustion engine 10. A throttle motor 16 is connected to the throttle valve 14. The opening amount of the throttle valve 14 (the throttle valve opening amount TA) is adjusted by controlling the throttle motor 16, whereby the amount of air supplied into a combustion chamber 18 through the intake passage 12 is adjusted. A fuel injection valve 20 is provided in the intake passage 12. The fuel injection valve 20 injects fuel into the intake passage 12. In addition, an exhaust gas purification catalyst 34 is provided in an exhaust passage 28 of the internal combustion engine 10.

In the combustion chamber 18 of the internal combustion engine 10, the air-fuel mixture formed of the intake air and the injected fuel is ignited by a spark plug 22. Thus, the air-fuel mixture is burned, whereby a piston 24 reciprocates, causing a crankshaft 26 to rotate. The burned air-fuel mixture, that is, exhaust gas is discharged from the combustion chamber 18 to the exhaust passage 28, purified in the exhaust gas purification catalyst 34, and then discharged out of the exhaust passage 28.

Figure 2:
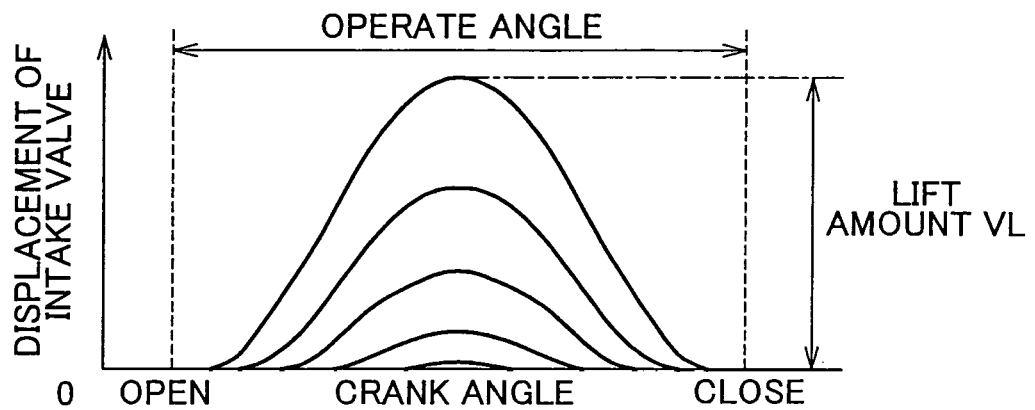
FIG. 2 is a graph showing the manner in which the lift amount of an intake valve changes based on the operation of a variable lift mechanism.

In the internal combustion engine 10, communication between the intake passage 12 and the combustion chamber 18 is permitted/blocked by opening/closing an intake valve 30. The intake valve 30 is opened and closed by rotation of an intake camshaft 32 to which rotation of the crankshaft 26 is transmitted. In addition, a variable lift mechanism 42 is provided between the intake valve 30 and the intake camshaft 32. The variable lift mechanism 42 changes the lift amount (more specifically, the maximum lift amount) VL of the intake valve 30 based on the operating state of the internal combustion engine 10. The variable lift mechanism 42 is actuated by an actuator 44 that is, for example, an electric motor. As shown in FIG. 2, the lift amount VL of the intake valve 30 is changed in synchronization with the valve—duration (operation angle) of the intake valve 30 by the variable lift mechanism 42. For example, as the operation angle decreases, the lift amount VL also decreases.

The air-fuel ratio control apparatus according to the first embodiment of the invention is provided with various sensors that detect the operating state of the internal combustion engine 10 (FIG. 1). Examples of these sensors include a crank sensor 52 that detects the rotational speed of the crankshaft 26 (the engine speed NE); an intake air amount sensor 54 that detects the amount of intake air flowing through the intake passage 12 (the passage intake air amount GA); and an acceleration stroke sensor 56 that detects the depression amount AC of an accelerator pedal 36. In addition, a throttle sensor 58 that detects the throttle valve opening amount TA, and a lift amount sensor 60 that detects the lift amount VL of the intake valve 30 (more specifically, the operation amount of the variable lift mechanism 42) are provided. Further, an air-fuel ratio sensor 62 that is provided upstream of the exhaust gas purification catalyst 34 in the exhaust passage 28 (more specifically, in an exhaust manifold) and that outputs a signal indicating the oxygen concentration in the exhaust gas, an oxygen sensor 64 provided downstream of the exhaust gas purification catalyst 34 in the exhaust passage 28, which outputs a signal indicating the oxygen concentration in the exhaust gas, etc. are provided.

Figure 3:
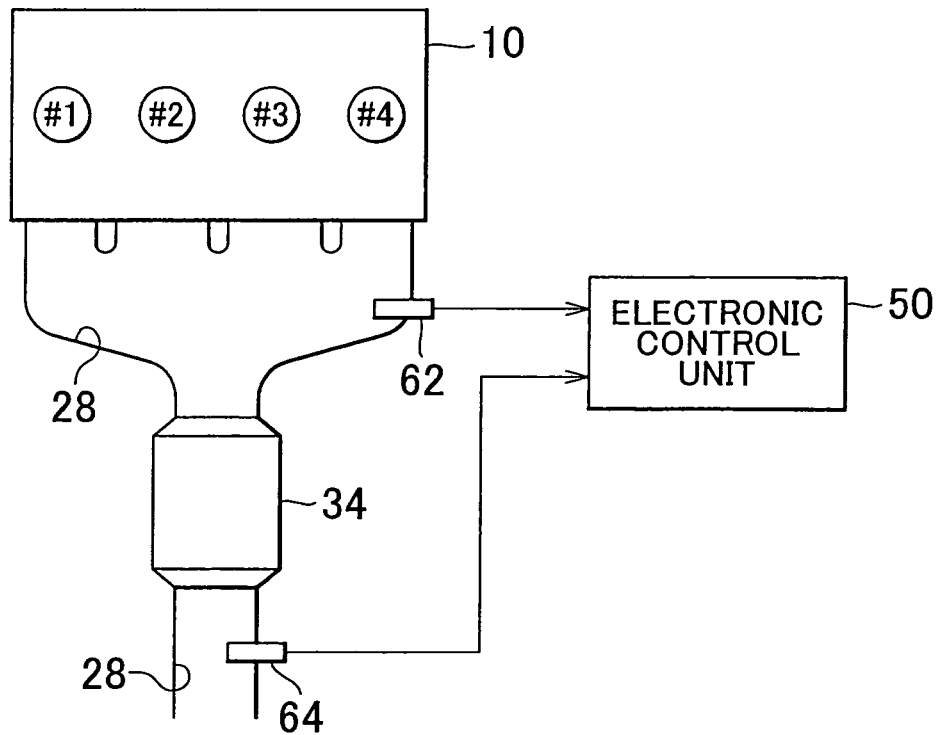
FIG. 3 is a view schematically showing the positions of an air-fuel ratio sensor and an oxygen sensor in an exhaust passage.

As shown in FIG. 3, the internal combustion engine 10 includes four cylinders #1, #2, #3, and #4. The air-fuel ratio sensor 62 is provided at the portion (more specifically, the exhaust manifold) at which the exhaust passages 28, extending from the cylinders #1 to #4, join together. The air-fuel ratio sensor 62 is shared by all the cylinders #1 to #4.

The air-fuel ratio sensor 62 is a known limiting current oxygen sensor. The limiting current oxygen sensor is configured by providing a ceramic layer, called a diffusion-controlled layer, in a detection portion of a concentration cell oxygen sensor. With this configuration, the limiting current oxygen sensor outputs an output current corresponding to the oxygen concentration in the exhaust gas. When the air-fuel ratio of the air-fuel mixture, which is closely related to the oxygen concentration in the exhaust gas, equals the stoichiometric air-fuel ratio, the output current is "0". As the air-fuel ratio of the air-fuel mixture becomes lower than the stoichiometric air-fuel ratio by a larger amount, the output current increases in the negative direction. On the other hand, as the air-fuel ratio of the air-fuel mixture becomes higher than the stoichiometric air-fuel ratio by a larger amount, the output current increases in the positive direction. Accordingly, the amount by which the air-fuel ratio of the air-fuel mixture is higher/lower than the stoichiometric air-fuel ratio is detected based on the signal output from the air-fuel ratio sensor 62.

The oxygen sensor 64 is a known concentration cell oxygen sensor. When the oxygen concentration in the exhaust gas is a value at which the air-fuel ratio of the air-fuel mixture is lower than the stoichiometric air-fuel ratio, an output voltage of approximately 1 volt is calculated from the concentration cell oxygen sensor. On the other hand, when the oxygen concentration in the exhaust gas is a value at which the air-fuel ratio of the air-fuel mixture is higher than the stoichiometric air-fuel ratio, an output voltage of approximately 0 volt is calculated from the concentration cell oxygen sensor The output voltage from the concentration cell oxygen sensor largely changes when the oxygen concentration in the exhaust gas is a value at which the air-fuel ratio of the air-fuel mixture is at or around the stoichiometric air-fuel ratio. Thus, it is possible to determine, based on the signal output from the oxygen sensor 64, whether the properties of the exhaust gas present downstream of the exhaust gas purification catalyst 34 are indicative of a lean air-fuel ratio or a rich air-fuel ratio.

The oxygen sensor 64 is provided downstream of the exhaust gas purification catalyst 34 in order to monitor the condition of the exhaust gas purification action of the exhaust gas purification catalyst 34. Namely, when the reducing action in the exhaust gas purification catalyst 34 is promoted and oxygen is released into the exhaust gas, the signal output from the oxygen sensor 64 indicates a value corresponding to a lean air-fuel ratio. On the other hand, when the oxidizing action in the exhaust gas purification catalyst 34 is promoted and the oxygen in the exhaust gas is consumed, the signal output from the oxygen sensor 64 indicates a value corresponding to a rich air-fuel ratio. The condition of the exhaust gas purification action of the exhaust gas purification catalyst 34 is monitored based on the detection results calculated by the oxygen sensor 64.

In the first embodiment of the invention, an electronic control unit (hereinafter, simply referred to as an "ECU") 50 including, for example, a microcomputer is provided. The ECU 50 receives detection signals from various sensors, and performs various computations. The ECU 50 performs, based on the results of computations, various controls such as the drive control of the throttle motor 16 (throttle control), the drive control of the fuel injection valve 20 (fuel injection control), and the drive control of the actuator 44 (the variable lift control).

In the first embodiment of the invention, the amount of air taken in the combustion chamber 18 (the amount of air taken in the cylinder) is adjusted as follows by the throttle control and the variable lift control. Namely, the control target value for the amount of air taken in the cylinder (hereinafter, referred to as the "target in-cylinder intake air amount Tga") is calculated based on the depression amount AC of the accelerator pedal 36 and the engine speed NE. Then, the throttle control and the variable lift control are performed so that the actual in-cylinder intake air amount becomes equal to the target-in-cylinder intake air amount Tga. When the throttle control and the variable lift control are performed, if the engine has not been sufficiently warmed (for example, when the temperature of the engine coolant is lower than a predetermined temperature), the lift amount VL is fixed at an operation angle at which the lift amount VL is large, while the throttle valve opening amount TA is changed to adjust the in-cylinder intake air amount. However, if the engine has been sufficiently warmed (for example, when the temperature of the engine coolant is equal to or higher than the predetermined temperature), both the throttle valve opening amount TA and the lift amount VL may be changed to adjust the in-cylinder intake air amount. At this time, basically, as the in-cylinder intake air amount appropriate for the operating state of the internal combustion engine 10 (the estimated in-cylinder intake air amount Vga, described later in detail) increases, the lift amount VL and the throttle valve opening amount TA of the intake valve 30 are also increased.

In the first embodiment of the invention, the fuel injection amount is adjusted based on the in-cylinder intake air amount that is adjusted by the throttle control and the variable lift control. More specifically, the actual in-cylinder intake air amount (the estimated in-cylinder intake air amount Vga) is calculated based on the passage intake air amount GA, etc., and the fuel amount at which the air-fuel ratio of the air-fuel mixture is equal to the stoichiometric air-fuel ratio is calculated as the fuel injection amount command value (the target injection amount Tq) for the estimated in-cylinder intake-air amount Vga. Then, the fuel injection valve 20 is driven so that the target injection amount Tq of fuel is injected from the fuel injection valve 20. Thus, the air-fuel ratio of the air-fuel mixture that is burned in the combustion chamber 18 is brought close to the stoichiometric air-fuel ratio.

When an air-fuel mixture having an air-fuel ratio at or around the stoichiometric air-fuel ratio is burned, the exhaust gas purification catalyst 34 oxidizes HC and CO in the exhaust gas and reduces NOx in the exhaust gas, thereby purifying the exhaust gas. Especially, when the air-fuel ratio is within a narrow range in which the air-fuel ratio is at or around the stoichiometric air-fuel ratio, the main pollutants (HC, CO, NOx) in the exhaust gas are all efficiently removed. Accordingly, to have the exhaust gas purification catalyst 34 efficiently function, the air-fuel ratio of the air-fuel mixture needs to be accurately adjusted so that the air-fuel ratio matches the center of the range.

Hereafter, the outline of such adjustment of the air-fuel ratio will be described.

First, the actual air-fuel ratio of the air-fuel mixture is determined by the air-fuel ratio sensor 62. The feedback correction amount MFB is calculated based on the deviation of the actual air-fuel ratio from the target air-fuel ratio (the stoichiometric air-fuel ratio), and the target injection amount Tq is corrected based on the feedback correction amount MFB. The fuel injection amount is adjusted through the feedback control performed based on the feedback correction amount MFB so that the actual air-fuel ratio becomes equal to the target air-fuel ratio.

Whether the exhaust gas purification catalyst 34 is storing oxygen or releasing oxygen is estimated based on the detection results calculated by the oxygen sensor 64. Based on the estimation result, the target injection amount Tq is further corrected. More specifically, the sub-feedback correction amount SFBa used to correct the target injection amount Tq is set. When the signal from the oxygen sensor 64 indicates a value corresponding to a rich air-fuel ratio, the sub-feedback correction amount SFBa is reduced by the predetermined amount a in each cycle of calculating the sub-feedback correction amount SFBa so that the fuel injection amount is gradually decreased. On the other hand, when the signal from the oxygen sensor 64 indicates a value corresponding to a lean air-fuel ratio, the sub-feedback correction amount SFBa is increased by the predetermined amount in each cycle of calculating the feedback correction amount SFBa so that the fuel injection amount is gradually increased. The fuel injection amount is adjusted, based on the actual condition of the exhaust gas purification action of the exhaust gas purification catalyst 34, through the sub-feedback control (the sub-air-fuel ratio control) performed based on the sub-feedback correction amount SFBa. As a result, the exhaust gas purification catalyst 34 efficiently purifies the exhaust gas.

In the internal combustion engine 10, the passage area of the communication portion, at which the intake passage 12 communicates with the combustion chamber 18, may deviate from the reference passage area due to the individual difference, time degradation, fitting error of the variable lift mechanism 42 or deposits adhering to the intake valve 30. Accordingly, even if the lift amount VL of the intake valve 30 is adjusted in the same manner, the actual in-cylinder intake air amount deviates from a reference in-cylinder intake air amount, which is the expected in-cylinder intake air amount under conditions where the actual passage area equals the reference passage area. According to the first embodiment of the invention, basically, adjusting the air-fuel ratio in the above-described manner compensates for the deviation of the actual in-cylinder intake air amount from the reference in-cylinder intake air amount due to the deviation of the actual passage area from the reference passage area.

The deviation of the actual in-cylinder intake air amount from the reference in-cylinder intake air amount due to the deviation of the actual passage from the reference passage area largely varies depending on the manner in which the variable lift mechanism 42 is operated (the lift amount VL). The reasons will be described below.

Figure 4:
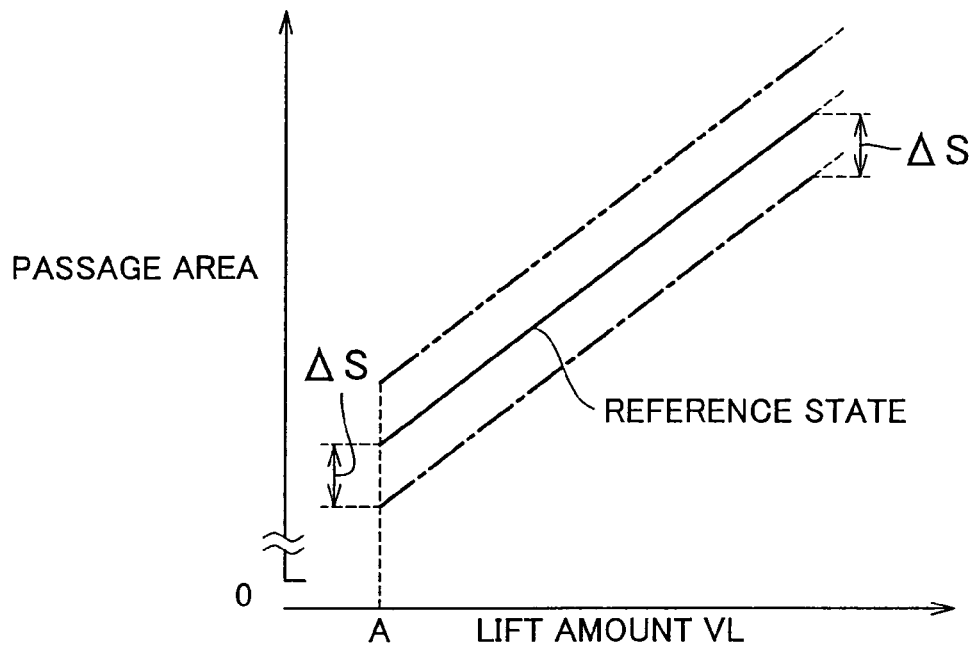
FIG. 4 is a graph showing the relationship between the lift amount of the intake valve and the passage area of a communication portion at which an intake passage is communicated with a combustion chamber of an internal combustion engine.

FIG. 4 shows the relationship between the lift amount VL of the intake valve 30 and the passage area. In FIG. 4, the solid line indicates an example of the relationship realized when the actual passage area equals the reference passage area (reference state). The chain line indicates an example of the relationship realized when the actual passage area is smaller than the reference passage area. The chain double-dashed line indicates an example of the relationship realized when the actual passage area is larger than the reference passage area.

Figure 5:
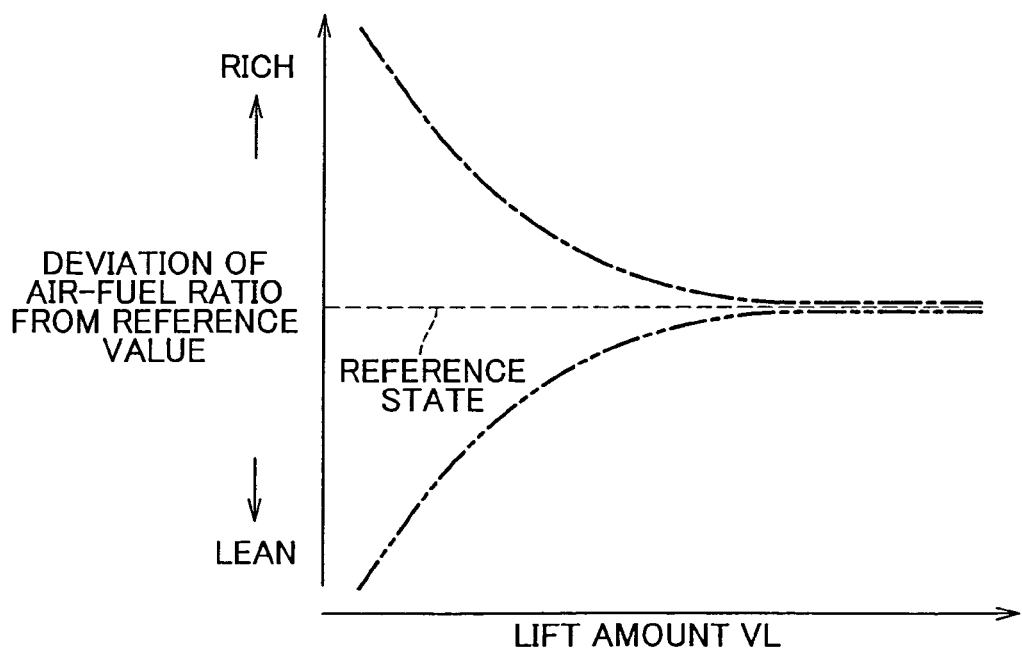
FIG. 5 is a graph showing the relationship between the lift amount of the intake valve and the deviation of the air-fuel ratio from the reference air-fuel ratio.

In the first embodiment of the invention, the in-cylinder intake air amount is adjusted by changing the lift amount VL of the intake valve 30. Accordingly, when the internal combustion engine 10 operates at low load, for example, when the internal combustion engine 10 is at idle, the lift amount VL is set to a small value and, therefore, the passage area becomes considerably small. As is clear from FIG. 4, as the lift amount VL is set to a smaller value, the ratio of the deviation AS of the actual passage area from the reference passage area to the entire passage area increases. Accordingly, when the actual passage area deviates from the reference passage area, the influence of such deviation becomes more prominent as the lift amount VL of the intake valve 30 decreases. More specifically, as the lift amount VL of the intake valve 30 decreases, the deviation of the actual in-cylinder intake air amount from the reference in-cylinder intake air amount increases. Accordingly, as shown in FIG. 5, in each of the case where the passage area is small (indicated by the chain line in FIG. 5) and the case where the passage area is large (indicated by the chain double-dashed line in FIG. 5), the deviation of air-fuel ratio from the reference air-fuel ratio is large.

In the first embodiment of the invention, because the lift amount VL of the intake valve 30 is frequently changed based on the current operating state of the internal combustion engine 10, the deviation of the actual air-fuel ratio from the reference air-fuel ratio is also frequently changed in accordance with the change in the lift amount VL. The deviation of the actual air-fuel ratio from the reference air-fuel ratio changes so frequently that it cannot be accurately compensated for even if the feedback control is performed based on the feedback correction amount MFB and the sub-feedback control is performed based on the sub-feedback correction amount SFBa.

In the first embodiment of the invention, the relationship between the deviation of the sub-feedback correction amount SFBa from the reference value (more specifically, "0") and the lift amount VL is learned in the sub-feedback control. Then, the learned deviation value Gka is calculated based on the lift amount VL, using the learned relationship. Also, the target injection amount Tq is corrected using the sub-feedback correction amount SFBa including the learned deviation value Gka.

Hereafter, the routine of the sub-feedback control including a step for learning the above-described relationship and a step for calculating the learned deviation value Gka will be described.

Figure 6:
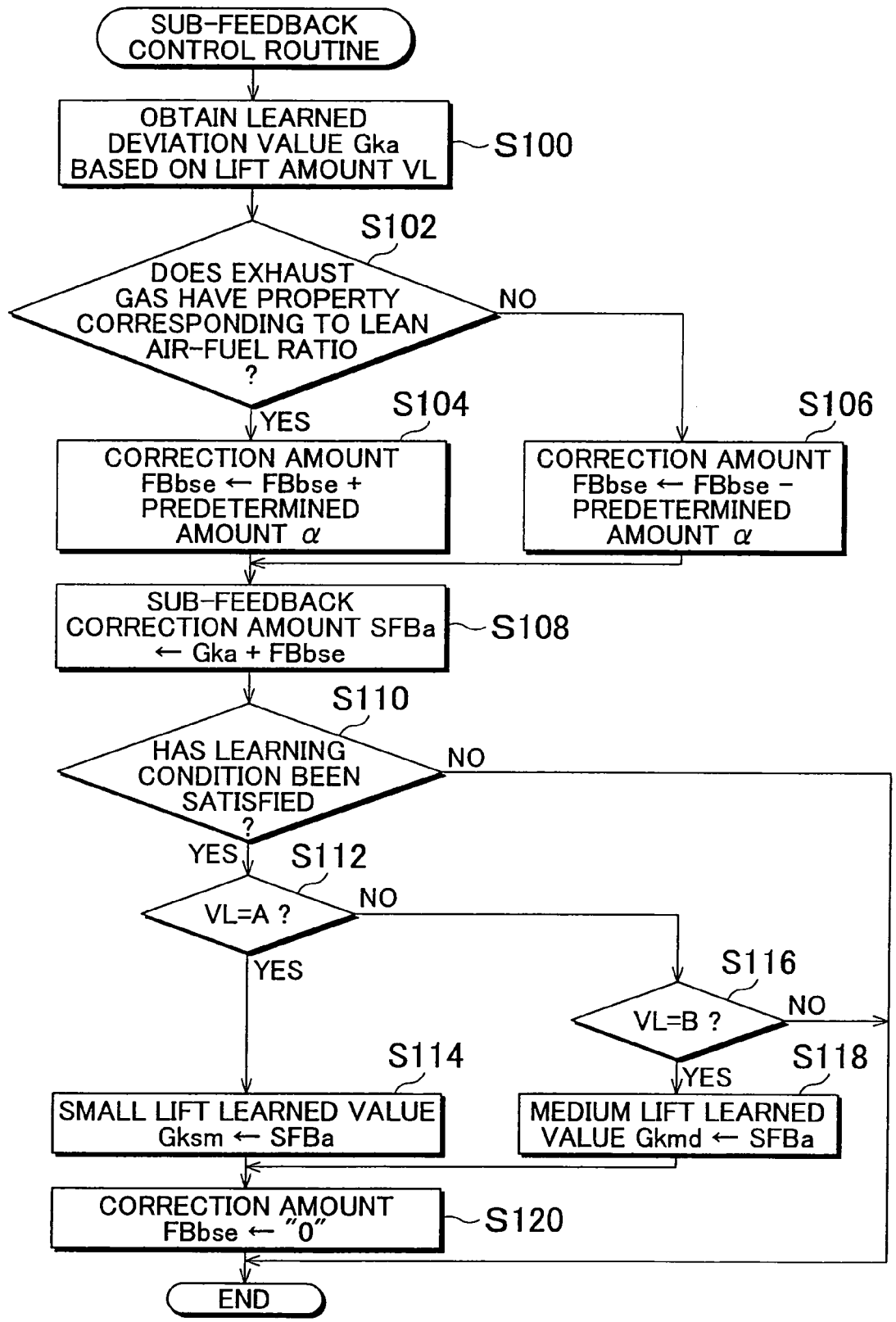
FIG. 6 is a flowchart showing the routine of the sub-feedback control according to the first embodiment of the invention.

FIG. 6 is the flowchart specifically showing the routine of the sub-feedback control. The routine shown in the flowchart is performed by the ECU 50 at predetermined intervals.

As shown in FIG. 6, first, steps for calculating the sub-feedback correction amount SFBa (steps S100 to S108) are performed. Namely, the learned deviation value Gka is calculated based on the lift amount VL of the intake valve 30, the learned small lift value Gksm, and the learned medium lift value Gkmd (step S100). The learned small lift value Gksm is the deviation of the sub-feedback correction amount SFBa from the reference value when the lift amount VL of the intake valve 30 is the specific lift amount A. The specific lift amount A is the lift amount VL that is set when the internal combustion engine 10 is at idle, and that is the minimum lift amount VL which can be realized by the variable lift control. The learned medium lift value Gkmd is the deviation of the sub-feedback correction amount SFBa from the reference value when the lift amount of the intake valve 30 is the specific lift amount B that is slightly larger than the specific lift amount A. The learned small lift value Gksm and the learned medium lift value Gkmd are learned in the steps (steps S110 to S118), described later in detail.

Figure 7:
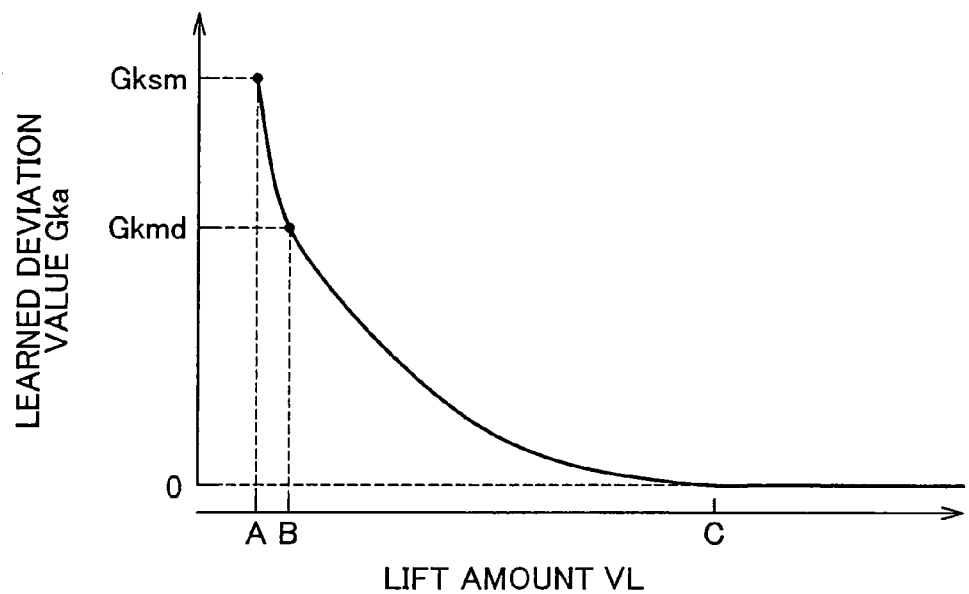
FIG. 7 is a graph showing the relationship between the lift amount of the intake valve and the learned deviation value in the first embodiment of the invention.

FIG. 7 shows the relationship among the lift amount VL, the learned small lift value Gksm, the learned medium lift value Gkmd, and the learned deviation value Gka. As shown in FIG. 7, the learned deviation value Gka increases as the lift amount VL decreases. The learned deviation value Gka is calculated as follows. When the lift amount VL is the specific lift amount A, the learned small lift value Gksm is calculated as the learned deviation value Gka.

In the range where the lift amount VL is smaller than the specific lift amount B, a value, which is interpolated between the learned small lift value Gksm and the learned medium lift value Gkmd based on the relationship among the lift amount VL, the specific lift amount A and the specific lift amount B, is calculated as the learned deviation value Gka. More specifically, the learned deviation value Gka is calculated according to the following equation using the predetermined conversion coefficient K1. The conversion coefficient K1 is set to a positive value equal to or lower than "1" based on the lift amount VL.

$$Gka=Gkmd+(Gksm-Gkmd)(VL-B)K1/(A-B)$$

When the lift amount VL is the specific lift amount B, the learned medium lift value Gkmd is calculated as the learned deviation value Gka.

In the range where the lift amount VL is larger than the specific lift amount B and smaller than the predetermined lift amount C, a value, which is interpolated between the learned medium lift value Gkmd and "0" based on the relationship among the lift amount VL, the specific lift amount B and the predetermined lift amount C, is calculated as the learned deviation value Gka. More specifically, the learned deviation value Gka is calculated according to the following equation using the predetermined conversion coefficient K2. The conversion coefficient K2 is set to a positive value equal to or smaller than "1" based on the lift amount VL.

$$Gka=Gkmd(VL-C)K2/(B-C)$$

In the range where the lift amount VL is equal to or larger than the predetermined lift amount C, the learned deviation value Gka is set to "0". In other words, in this range, the learned deviation value Gka is not calculated, and the target injection amount Tq is not corrected based on the learned deviation value Gka.

After the learned deviation value Gka is thus calculated, it is determined whether the properties of the exhaust gas present downstream of the exhaust gas purification catalyst 34 are indicative of a lean air-fuel ratio (step S102 in FIG. 6), and the correction amount FBbse is updated based on the determination result. More specifically, if it is determined that the properties of the exhaust gas present downstream of the exhaust gas purification catalyst 34 are indicative of a lean air-fuel ratio ("YES" in step S102), the predetermined amount a is added to the correction amount FBbse (step S104). On the other hand, if it is determined that the properties of the exhaust gas present downstream of the exhaust gas purification catalyst 34 are indicative of a rich air-fuel ratio ("NO" in step S102), the predetermined amount a is subtracted from the correction amount FBbse (step S106).

Then, the sub-feedback correction amount SFBa is calculated by adding the learned deviation value Gka to the updated correction amount FBbse (step S108).

Next, the learned small lift value Gksm and the learned medium lift value Gkmd are learned.

First, it is determined whether the learning condition has been satisfied (step S110). More specifically, it is determined that the learning condition has been satisfied, if both of the following conditions have been satisfied.

The internal combustion engine 10 has been sufficiently warmed (the temperature of the coolant is equal to or higher than a predetermined value).

The stable engine operating state, where neither sudden acceleration nor sudden deceleration is performed, has been continued for a predetermined time period.

If it is determined that the learning condition has been satisfied ("YES" in step S110) and the lift amount VL is the specific lift amount A ("YES" in step S112), the current sub-feedback correction amount SFBa is stored as the learned small lift value Gksm (step S114).

On the other hand, if it is determined that the learning condition has been satisfied ("YES" in step S110) and the lift amount VL is the specific lift amount B ("NO" in step S112 and "YES" in step S116), the current sub-feedback correction amount SFBa is stored as the learned medium lift value Gkmd (step S118).

After the learned small lift value Gksm or the learned medium lift value Gkmd is learned in the above-described manner, the correction amount FBbse is set to "0" (step S120), after which the routine ends.

On the other hand, if it is determined that the learning condition has not been satisfied ("NO" in step S110), or when the lift amount VL is neither the specific lift amount A nor the specific lift amount B ("NO" in step S112 and "NO" in step S116), the routine ends without learning the small lift learned value Gksm and the medium lift learned value Gkmd and updating the correction amount FBbse.

The effects that can be calculated by performing the process for the sub-feedback control will be described below.

In the sub-feedback control, a value corresponding to the current lift amount VL of the intake valve 30 is calculated as the learned deviation value Gka. More specifically, as the lift amount VL decreases, a smaller value is calculated as the learned deviation value Gka. Therefore, the learned deviation value Gka is calculated based on the tendency that the deviation of the sub-feedback correction amount SFBa from the reference value increases as the lift amount VL decreases when the actual passage area of the communication portion differs from the reference passage area. Then, the target injection amount Tq is corrected based on the sub-feedback correction amount SFBa including the learned deviation value Gka. Accordingly, although the lift amount VL of the intake valve 30 is frequently changed through the variable lift control, such frequent change in the lift amount VL can be compensated for. This is because the sub-feedback correction amount SFBa is calculated in anticipation of the change in the deviation of the air-fuel ratio from the reference air-fuel ratio due to the change in the lift amount VL. Thus, the influence of the change in the lift amount VL, which may be exerted on the air-fuel ratio, is accurately suppressed. As a result, the air-fuel ratio of the air-fuel mixture is accurately controlled to a desired ratio.

In addition, because the sub-feedback correction amount SFBa includes the correction amount FBbse that is increased or decreased by the predetermined amount α in each cycle of calculating the correction amount FBbse based on the signal from the oxygen sensor 64, the fuel injection amount is increased or decreased so that the air-fuel ratio of the air-fuel mixture becomes equal to a desired air-fuel ratio through correction based on the sub-feedback correction amount SFBa. Thus, the fuel injection amount is increased or decreased based on the condition of the exhaust gas purification action of the exhaust gas purification catalyst 34. As a result, the exhaust gas is purified more effectively.

Because the internal combustion engine 10 according to the first embodiment includes multiple cylinders, variation in the air-fuel ratio of the air-fuel mixture among the cylinders cannot be avoided due to individual difference of the fuel injection valves 20 and deposit adhering to the intake valves 30. In the first embodiment of the invention, the air-fuel ratio sensor 62 that detects the air-fuel ratio of the air-fuel mixture in each cylinder is shared by all the cylinders. Accordingly, the degree of ease at which the exhaust gas from the cylinder contacts the air-fuel ratio sensor 62 varies among the cylinders.

Figure 8:
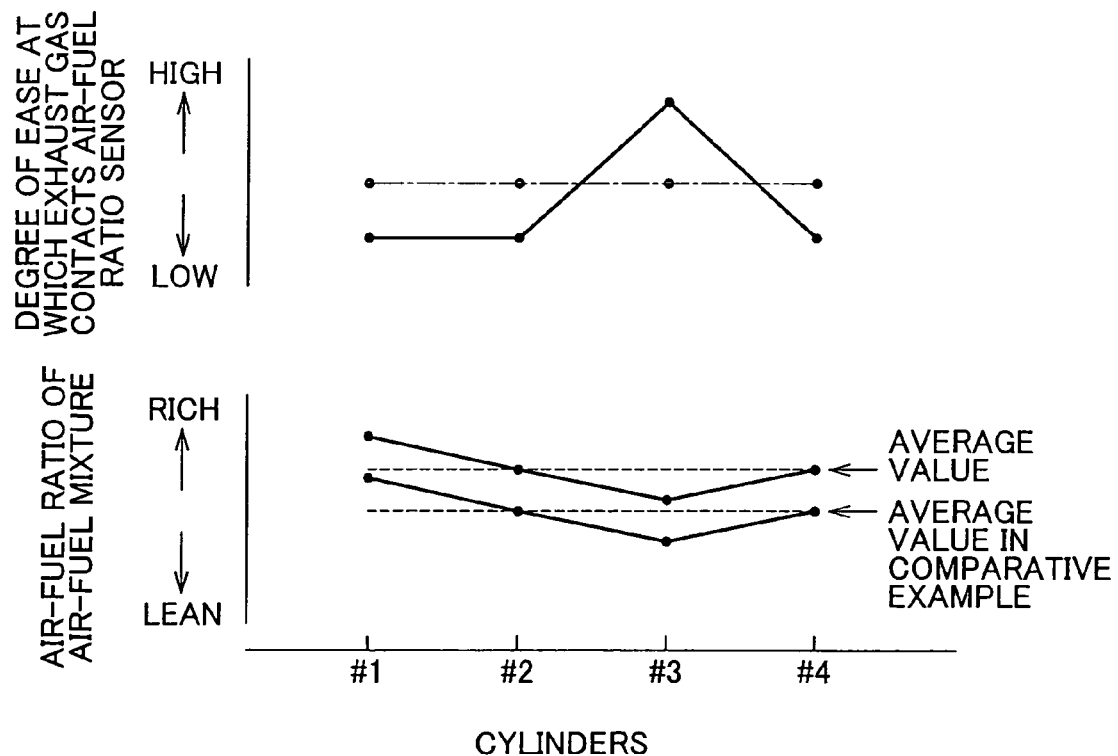
FIG. 8 is a graph showing the degree of ease at which exhaust gas contacts the air-fuel ratio sensor and the properties of the exhaust gas in each cylinder.

Therefore, if the target injection amount Tq is corrected based on the signal output from the air-fuel ratio sensor 62, variation in the air-fuel ratio among the cylinders reduces the accuracy in adjustment of the properties of the exhaust gas present upstream of the exhaust gas purification catalyst 34 to the properties indicative of an air-fuel ratio at or around the stoichiometric air-fuel ratio. More specifically, as shown by the solid line in FIG. 8, when the internal combustion engine has a structure where the exhaust gas from a predetermined cylinder (the cylinder #3 in the example shown in FIG. 8) contacts the air-fuel ratio sensor 62 more easily than the exhaust gas from the other cylinders (the cylinders #1, #2, and #4), and the properties of the exhaust gas from the cylinder #3 are indicative of a lean air-fuel ratio, the target injection amount Tq is excessively increased, which reduces the average value of the air-fuel ratio of the air-fuel mixture below the stoichiometric air-fuel ratio. The chain line in FIG. 8 indicates the degree of ease at which the exhaust gas from each cylinder contacts the air-fuel ratio sensor 62 and the air-fuel ratio of the air-fuel mixture, when the exhaust gases from the cylinders contact the air-fuel ratio sensor 62 with the same ease.

Accordingly, with the air-fuel ratio control apparatus according to the first embodiment of the invention, the deviation of the value output from the oxygen sensor 64 provided downstream of the exhaust gas purification catalyst 34 from the reference value (the value corresponding to the oxygen concentration in the exhaust gas when the air-fuel ratio of the air-fuel mixture equals the stoichiometric air-fuel ratio) is likely to be large, and, consequently, the change in the deviation of the actual air-fuel ratio from the reference air-fuel ratio due to the change in the lift amount VL is likely to be large. According to the first embodiment of the invention, the air-fuel ratio control apparatus applied to such multi-cylinder internal combustion engine 10 accurately controls the air-fuel ratio of the air-fuel mixture to a desired ratio.

Even when the passage area of the communication portion deviates from the reference passage area, there is almost no influence of such deviation on the air-fuel ratio in the range where the lift amount VL of the intake valve 30 is large and the passage area is considerably large.

In the sub-feedback control, in such a range, more specifically, in the range where the lift amount VL is equal to or larger than the predetermined lift amount C, the learned deviation value Gka is not calculated, and the target injection amount Tq is not corrected based on the learned deviation value Gka. In other words, on the condition that the lift amount VL is smaller than the predetermined lift amount C, the learned deviation value Gka is calculated and the target injection amount Tq is corrected based on the learned deviation value Gka. Accordingly, only in the range which is different from the above-described range and in which the lift amount is relatively small, in other words, in the range where the influence of the deviation of the actual passage area from the reference passage area may be exerted upon the air-fuel ratio, the learned deviation value Gka is calculated and the target injection amount Tq is corrected based on the learned deviation value Gka.

In the sub-feedback control, the function that is defined by the lift amount VL of the intake valve 30, the learned small lift value Gksm, the learned medium lift value Gkmd, the learned deviation value Gka and the conversion coefficients K1 and K2 is set, in advance, to a linear function, based on which the learned deviation value Gka increases as the lift amount VL decreases (see FIG. 7). Then, the relationship between the lift amount of the intake valve 30 and the deviation of the sub-feedback correction amount SFBa from the reference value is learned so that the slope of the function is changed based on the deviation of the sub-feedback correction amount SFBa from the reference value when the lift amount VL is the specific lift amount A or the specific lift amount B.

Therefore, as compared with the configuration in which many lift amount ranges are set, the deviation of the sub-feedback correction amount SFba from the reference value for each range is calculated, and the learned deviation value is set to the calculated deviation, the relationship between the lift amount VL of the intake valve 30 and the deviation of the sub-feedback correction amount SFba from the reference value is learned at low frequency in the wide lift amount range.

In addition, the relationship between the lift amount VL of the intake valve 30 and the deviation of the sub-feedback correction amount SFba from the reference value is changed based not only on the deviation when the lift amount VL is the specific lift amount A but also the deviation when the lift amount VL is the specific lift amount B. Accordingly, as compared with the configuration in which the relationship is changed based only on the deviation when the lift amount VL is the specific lift amount A, the relationship is learned so as to be appropriate for the actual deviation in the entire wide lift amount range.

In the sub-feedback control, the specific lift amount A at which the learned small lift value Gksm is learned is set to the lift amount VL that is set when the internal combustion engine 10 is at idle and that is the minimum lift amount which can be achieved by the variable lift control. Thus, in the engine idling operating state in which the operation is performed stably, in other words, in the state where the deviation of the sub-feedback correction amount SFba from the reference value is stable, the learned small lift value Gksm is learned based on the deviation at the lift amount VL at which the influence of the deviation of the actual passage area from the reference passage area is exerted on the air-fuel ratio at the maximum level. As a result, the learned small lift value Gksm is accurately learned, and, consequently, the relationship between the lift amount VL of the intake valve 30 and the deviation of the sub-feedback correction amount SFba from the reference value is accurately learned.

As described so far, according to the first embodiment of the invention, the following effects can be calculated.

(1). The relationship between the deviation of the sub-feedback correction amount SFBa from the reference value and the lift amount VL of the intake valve 30 is learned, the learned deviation value Gka is calculated based on the lift amount VL, using the learned relationship, and target injection amount Tq is corrected based on the sub-feedback correction amount SFBa including the learned deviation value Gka. Accordingly, although the lift amount VL of the intake valve 30 is frequently changed through the variable lift control, such a change in the lift amount VL can be compensated for. This is because the sub-feedback correction amount SFBa is calculated in anticipation of the change in the deviation of the actual air-fuel ratio from the reference air-fuel ratio due to the change in the lift amount VL. Therefore, the influence of the change in the lift amount VL, which may be exerted on the air-fuel ratio, is accurately suppressed. As a result, the air-fuel ratio of the air-fuel mixture is accurately controlled to a desired air-fuel ratio.

(2). As the lift amount VL decreases, the learned deviation value Gka is set to a larger value. Accordingly, the learned deviation value Gka is set based on the tendency that the deviation of the sub-feedback correction amount SFBa from the reference value increases as the lift amount VL decreases when the passage area of the communication portion deviates from the reference passage area.

(3). On the condition that the lift amount VL is smaller than the predetermined lift amount C, the learned deviation value Gka is calculated and the target injection amount Tq is corrected based on the learned deviation value Gka. Accordingly, the learned deviation value Gka is calculated and the target injection amount Tq is corrected based on the learned deviation value Gka only in the range in which the influence of the deviation of the actual passage area of the communication portion from the reference passage area may be exerted on the air-fuel ratio.

(4). The linear function, based on which the learned deviation value Gka increases as the lift amount VL of the intake valve 30 decreases, is set in advance. The relationship between the lift amount VL of the intake valve 30 and the deviation of the sub-feedback correction amount SFBa from the reference value is learned so that the slope of the function is changed based on the deviation of the sub-feedback correction amount SFBa from the reference value when the lift amount VL is the specific lift amount A or the specific lift amount B. Therefore, as compared with the configuration in which many lift amount ranges are set, the deviation of the sub-feedback correction amount SFba from the reference value for each range is calculated, and the learned deviation value is set to the calculated deviation, the relationship is learned at low frequency in the wide lift amount range.

(5). The specific lift amount A at which the learned small lift value Gksm is learned is set to the lift amount VL that is set when the internal combustion engine 10 is at idle. Accordingly, the learned small lift value Gksm is learned when the deviation is stable, and the relationship between the lift amount VL of the intake valve 30 and the deviation of the sub-feedback correction amount SFba from the reference value is accurately learned.

(6). The specific lift amount A is set to the minimum lift amount that can be achieved by the variable lift control. Accordingly, the learned small lift value Gksm is learned based on the deviation corresponding to the lift amount at which the influence of the deviation of the actual passage area from the reference passage area on the air-fuel ratio is most prominent. As a result, the relationship between the lift amount VL of the intake valve 30 and the deviation of the sub-feedback correction amount SFba from the reference value is accurately learned.

(7). The relationship between the lift amount VL of the intake valve 30 and the deviation of the sub-feedback correction amount SFba from the reference value is changed based not only on the deviation when the lift amount VL is the specific lift amount A but also on the deviation when the lift amount VL is the specific lift amount B. Accordingly, as compared with the configuration in which the relationship is changed based only on the deviation when the lift amount VL is the specific lift amount A, the relationship between the lift amount VL of the intake valve 30 and the deviation of the sub-feedback correction amount SFba from the reference value is learned based on the actual deviation in the wide lift amount range.

(8). Because the air-fuel ratio control apparatus is applied to the multi-cylinder internal combustion engine 10, the change in deviation of the actual air-fuel ratio from the reference air-fuel ratio due to the change in the lift amount VL of the intake valve 30 is likely to be large. According to the first embodiment, however, the air-fuel ratio of the air-fuel mixture is accurately controlled to a desired ratio.

Next, a second embodiment of the invention will be described in detail.

The second embodiment of the invention differs from the first embodiment of the invention in the routine of the sub-feedback control.

Figure 9:
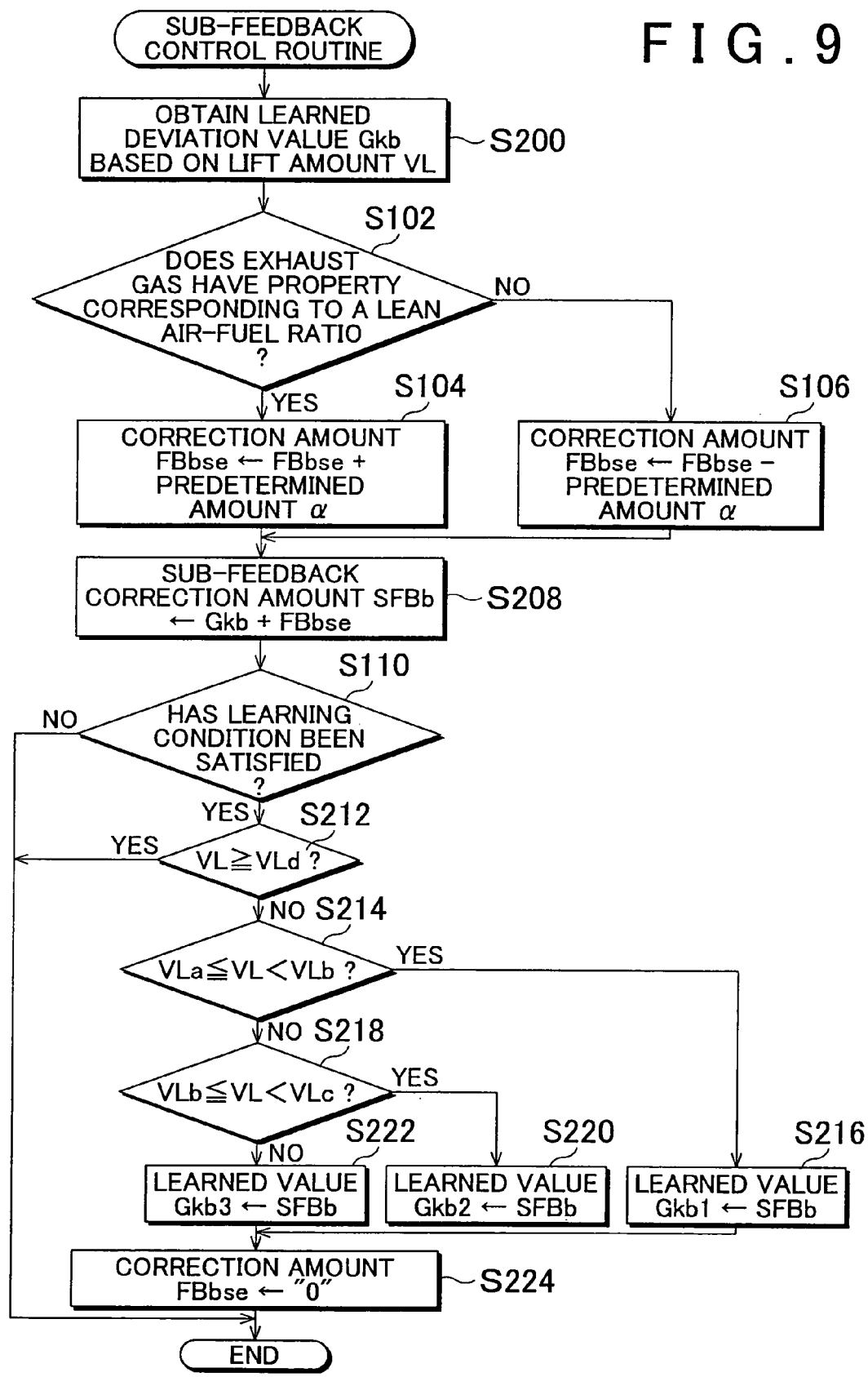
FIG. 9 is a flowchart showing the routine of the sub-feedback control according to a second embodiment of the invention.

Hereafter, the sub-feedback control according to the second embodiment will be described. FIG. 9 is the flowchart showing the routine of the sub-feedback control. The routine shown in the flowchart is performed by the electronic control unit 50 at predetermined intervals.

As shown in FIG. 9, first, the steps for calculating the sub-feedback correction amount SFBb (steps S100 to S108) are performed.

First, the learned deviation value Gkb is calculated based on the lift amount VL of the intake valve 30 (step S200). In the second embodiment of the invention, as shown in FIG. 10, multiple ranges (range 1 (VLa≦VL<VLb), range 2 (VLb≦VL<VLc), range 3 (VLc≦VL<VLd), and range 4 (VLd≦VL)) are set for the lift amount of the intake valve 30, and the learned values (Gkb1, Gkb2, Gkb3, and Gkb4) are set for the respective ranges. In step S200, one of the multiple ranges is selected based on the lift amount VL, and the learned value corresponding to the selected range is calculated as the learned deviation value Gkb.

The learned value Gkb4 corresponding to the range 4 in which the lift amount VL is equal to or larger than the predetermined lift amount VLd is set to "0". Accordingly, in the range 4, the learned deviation value Gkb is set to "0" regardless of the lift amount VL, and the target injection amount Tq is not corrected based on the learned deviation value Gkb. The learned values Gkb1 to Gkb3 are learned in the steps (steps S110 and S212 to S222 in FIG. 9) described later.

After the learned deviation value Gkb is thus calculated, it is determined whether the properties of the exhaust gas present downstream of the exhaust gas purification catalyst 34 are indicative of a lean air-fuel ratio (step S102). If it is determined that the properties of the exhaust gas present downstream of the exhaust gas purification catalyst 34 are indicative of a lean air-fuel ratio ("YES" in step S102), the predetermined amount a is added to the correction amount FBbse (step S104). On the other hand, if it is determined that the properties of the exhaust gas present downstream of the exhaust gas purification catalyst are indicative of a rich air-fuel ratio ("NO" in step S102), the predetermined amount a is subtracted from the correction amount FBbse (step S106).

The value calculated by adding the learned deviation value Gkb to the updated correction amount FBbse is calculated as the sub-feedback correction amount SFBb (step S208).

Next, the steps for learning the learned values Gkb1 to Gkb3 are performed. First, it is determined whether the learning condition has been satisfied (step S110). If it is determined that the learning condition has been satisfied ("YES" in step S110), each learned value is learned as follows based on the lift amount VL. When the lift amount VL is within the range 1 (VLa≦VL<VLb) ("NO" in step S212 and "YES" in step S214), the current sub-feedback correction amount SFBb is stored as the learned value Gkb1 (step S216). When the lift amount VL is within the range 2 (VLb≦VL<VLc) ("NO" in step S212, "NO" in step S214, and "YES" in step S218), the current sub-feedback correction amount SFBb is stored as the learned value Gkb2 (step S220). When the lift amount VL is within the range 3 (VLc≦VL<VLd) ("NO" in step S212, "NO" in step S214, and "NO" in step S128), the current sub-feedback correction amount SFBb is stored as the learned value Gkb3 (step S222).

When one of the learned values Gkb1 to Gkb3 is thus learned, the correction amount FBbse is set to "0" (step S224), after which the routine ends.

If it is determined that the learning condition has not been satisfied ("NO" in step S110), or when the lift amount VL is equal to or larger than the predetermined lift amount VLd ("YES" in step S212), the routine ends without learning the learned values Gkb1 to Gkb3 and updating the correction amount FBbse.

Next, the effects calculated by performing the steps of the sub-feedback control will be described.

In the sub-feedback control, the relationship between the deviation of the sub-feedback correction amount SFBb from the reference value and the lift amount VL of the intake valve 30 is learned, and the learned deviation value Gkb is calculated based on the lift amount VL, using the learned relationship. More specifically, multiple ranges 1 to 3 for the lift amount VL of the intake valve 30 are set, and the learned values Gkb1 to Gkb3 are learned and stored for the respective ranges 1 to 3. Then, one of the multiple ranges 1 to 3 is selected based on the lift amount VL, and the learned value corresponding to the selected range is calculated as the learned deviation value Gkb.

Therefore, a value, which is calculated based on the tendency that the deviation of the sub-feedback correction amount SFBb from the reference value increases as the lift amount VL decreases when the passage area of the communication portion deviates from the reference passage area, is calculated as the learned deviation value Gkb. More specifically, as the lift amount VL decreases, a larger value is calculated as the learned deviation value Gkb. Then, the target injection amount Tq is corrected based on the sub-feedback correction amount SFBb including such learned deviation value Gkb. Accordingly, although the lift amount VL of the intake valve 30 is frequently changed through the variable lift control, such a change in the lift amount VL can be compensated for. This is because the sub-feedback correction amount SFBa is calculated in anticipation of the change in the deviation of the air-fuel ratio from the reference air-fuel ratio due to the change in the lift amount VL. Thus, the influence of the change in the lift amount VL, which may be exerted on the air-fuel ratio, is accurately suppressed, and the air-fuel ratio of the air-fuel mixture is accurately controlled to a desired ratio.

In addition, the sub-feedback correction amount SFBb includes the correction amount FBbse that is increased or decreased by the predetermined amount α in each cycle of calculating the correction amount FBbse based on the signal from the oxygen sensor 64. Accordingly, the fuel injection amount is increased or decreased through the correction based on the sub-feedback correction amount SFBb so that the air-fuel ratio of the air-fuel mixture becomes a desired air-fuel ratio. Thus, the fuel injection amount is increased or decreased based on the condition of the exhaust gas purification action of the exhaust gas purification catalyst 34. As a result, the exhaust gas is purified efficiently.

The air-fuel ratio control apparatus according to the second embodiment of the invention is applied to the multi-cylinder internal combustion engine 10. Therefore, as in the case of the air-fuel ratio control apparatus according to the first embodiment of the invention, the deviation of the value output from the oxygen sensor 64 provided downstream of the exhaust gas purification catalyst 34 from the reference value is likely to be large, and, consequently, the change in deviation of the air-fuel ratio from the reference air-fuel ratio due to the change in the lift amount VL is likely to be large. According to the second embodiment, however, the air-fuel ratio of the air-fuel mixture is controlled to a desired ratio by such air-fuel ratio control apparatus.

Even when the passage area of the communication portion deviates from the reference passage area, there is almost no influence of such deviation on the air-fuel ratio in the range in which the lift amount VL of the intake valve 30 is large and the passage area is considerably large.

In the sub-feedback control, in such range, more specifically, in the range where the lift amount VL is equal to or larger than the predetermined lift amount VLd, the learned deviation value Gkb is not calculated and the target injection amount Tq is not corrected based on the learned deviation value Gkb. In other words, on the condition that the lift amount VL is smaller than the predetermined lift amount VLd, the learned deviation value Gkb is calculated and the target injection amount Tq is corrected based on the learned deviation value Gkb. Accordingly, only in the range which is different from the above-described range and in which the lift amount is relatively small, namely, the range where the influence of the deviation of the actual passage area from the reference passage area may be exerted on the air-fuel ratio, the learned deviation value Gkb is calculated and the target injection amount Tq is corrected based on the learned deviation value Gkb.

As described so far, the following effects can be calculated according to the second embodiment of the invention.

(1). The relationship between the deviation of the sub-feedback correction amount SFBb from the reference value and the lift amount VL of the intake valve 30 is learned, the learned deviation value Gkb is calculated based on the lift amount VL, using the learned relationship, and target injection amount Tq is corrected based on the sub-feedback correction amount SFBb including the learned deviation value Gkb. Accordingly, although the lift amount VL of the intake valve 30 is frequently changed through the variable lift control, such a change in the lift amount VL can be compensated for. This is because the sub-feedback correction amount SFBb is calculated in anticipation of the change in the deviation of air-fuel ratio from the reference air-fuel ratio due to the change in the lift amount VL Therefore, the influence of the change in the lift amount VL, which may be exerted on the air-fuel ratio, is accurately suppressed, and the air-fuel ratio of the air-fuel mixture is accurately controlled to a desired air-fuel ratio.

(2). The multiple ranges 1 to 3 are set for the lift amount VL, and the learned values Gkb1 to Gkb3 are learned and stored for the respective ranges. One of the multiple ranges 1 to 3 is selected based on the lift amount VL, and the learned value corresponding to the selected range is calculated as the learned deviation value Gkb. Accordingly, a value, which is calculated based on the tendency that the deviation of the sub-feedback correction amount SFBb from the reference value increases as the lift amount VL decreases when the passage area f the communication portion deviates from the reference passage area, is calculated as the learned deviation value Gkb. More specifically, as the lift amount VL decreases, a larger value is calculated as the learned deviation value Gkb.

(3). On the condition that the lift amount VL is smaller than the predetermined lift amount VLd, the learned deviation value Gkb is calculated and the target injection amount Tq is corrected based on the learned deviation value Gkb. Accordingly, the learned deviation value Gkb is calculated and the target injection amount Tq is corrected based on the learned deviation value Gkb only in the range in which the influence of the deviation of the actual passage area of the communication portion from the reference passage area may be exerted on the air-fuel ratio.

(4). Because the air-fuel ratio control apparatus is applied to the multi-cylinder internal combustion engine 10, the change in deviation of the actual air-fuel ratio from the reference air-fuel ratio due to the change in the lift amount VL of the intake valve 30 is likely to be large. According to the second embodiment, however, the air-fuel ratio of the air-fuel mixture can be accurately controlled to a desired ratio The embodiments described above may be modified as follows.

In the first embodiment of the invention, in the range in which the lift amount VL is larger than the specific lift amount A and smaller than the specific lift amount B, linear interpolation may be performed to calculate the learned deviation value Gka.

In the first embodiment of the invention, it may also be determined that the lift amount VL of the intake valve 30 is the specific lift amount A, if the lift amount VL is within the predetermined range (A1<VL<A2). Also, it may be determined that the lift amount VL is the specific lift amount B, if the lift amount VL is within the predetermined range (B1<VL<B2).

In the first embodiment of the invention, the learned deviation value may be calculated in any one of the following manners (I) to (III).

Figure 11:
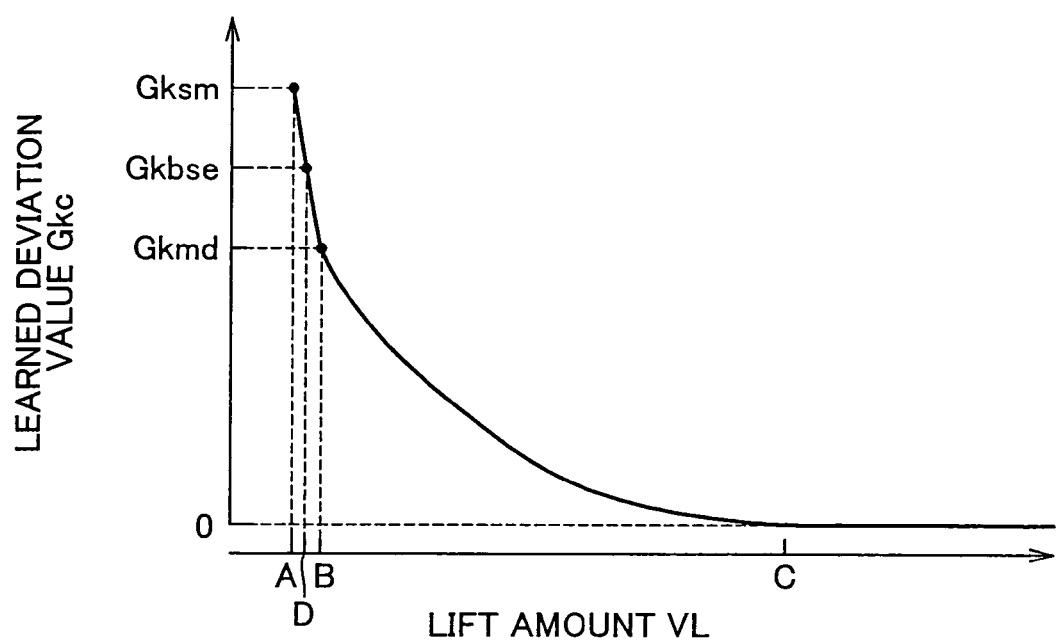
FIG. 11 is a graph showing the relationship between the lift amount of the intake valve and the learned deviation value according to another embodiment of the invention.

(I). FIG. 11 shows an example of the relationship between the lift amount VL of the intake valve 30 and the learned deviation value Gkc. As shown in FIG. 11, the learned small lift value Gksm and the learned medium lift value Gkmd are learned independently, and a value, which is interpolated between the learned small lift value Gksm and the learned medium lift value Gkmd based on the preset conversion coefficient, is calculated as the reference lift learned value Gkbse corresponding to the specific lift amount D (A<D<B). FIG. 11 shows an example where the conversion coefficient is set to the value at which the value that is calculated by the equation "Gks+Gkm/2" is calculated as the reference lift learned value Gkbse. When the lift amount VL is the specific lift amount D, the reference lift learned value Gkbse is calculated as the learned deviation value Gkc. On the other hand, in the range where the lift amount VL is smaller than the specific lift amount D, or the range where the lift amount VL is larger than the specific lift amount D and smaller than the predetermined lift amount C, a value, which is interpolated between the reference lift learned value Gkbse and "0" based on the relationship among the current lift amount VL, the specific lift amount D and the predetermined lift amount C and the conversion coefficient, is calculated as the learned deviation value Gkc. More specifically, the learned deviation value Gkc is calculated according to the following equation using the preset conversion coefficient K3. The conversion coefficient K3 is set based on the lift amount VL. The conversion coefficient K3 is set to a positive value equal to or larger than "1" in the range where the lift amount VL is smaller than the specific lift amount D. The conversion coefficient K3 is set to a positive value equal to or smaller than "1" in the range where the lift amount VL is larger than the specific lift amount D and smaller than the predetermined lift amount C.

$$Gkc = Gkbse(VL-C)K3/(D-C)$$

With such a configuration, even when a value that differs from the actual value is erroneously learned as the learned small lift value Gksm or the learned medium lift value Gkmd, the adverse effect of the erroneous learning can be minimized.

Figure 12:
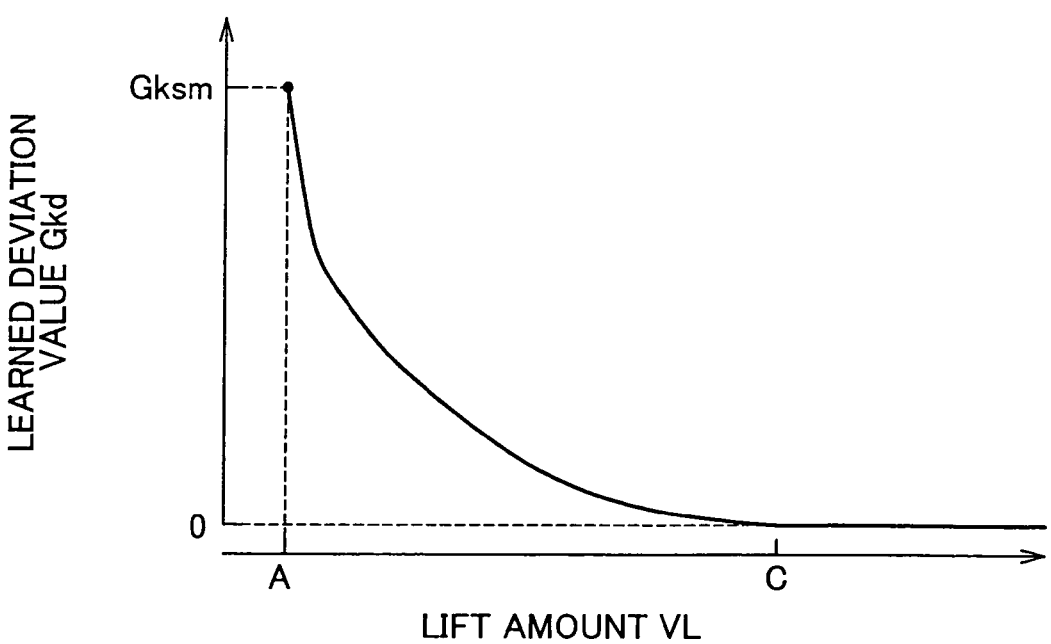
FIG. 12 is a graph showing the relationship between the lift amount of the intake valve and the learned deviation value according to another embodiment of the invention.

(II). FIG. 12 shows an example of the relationship between the lift amount VL of the intake valve 30 and the learned deviation value Gkd. As shown in FIG. 12, first, the learned small lift value Gksm is learned. When the lift amount VL is the specific lift amount A, the learned small lift value Gksm is calculated as the learned deviation value Gkd. On the other hand, in the range where the lift amount VL is larger than the specific lift amount A and smaller than the predetermined lift amount C, a value, which is interpolated between the learned small lift value Gksm and "0" based on the relationship among the current lift amount VL, the specific lift amount A and the predetermined lift amount C and the conversion coefficient, is calculated as the learned deviation value Gkd. More specifically, the learned deviation value Gkd is calculated according to the following equation using the present conversion coefficient K4. The conversion coefficient K4 is set to a positive value equal to or smaller than "1".

$$Gkd = Gksm(VL-C)K4/(A-C)$$

Figure 13:
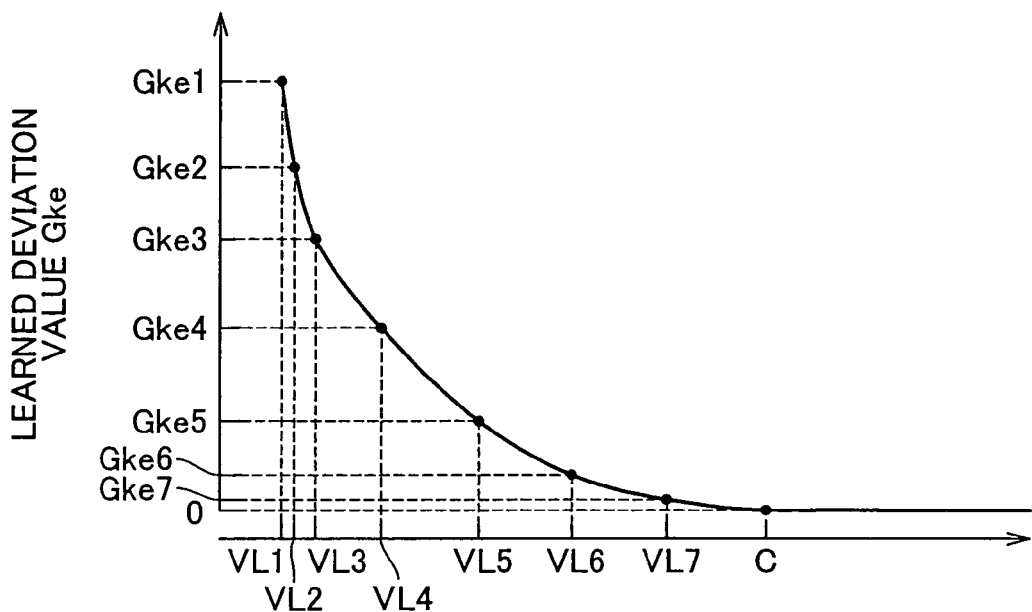
FIG. 13 is a graph showing the relationship between the lift amount of the intake valve and the learned deviation value according to another embodiment of the invention.

(III). FIG. 13 shows an example of the relationship between the lift amount VL of the intake valve 30 and the learned deviation value Gke. As shown in FIG. 13, the deviations when the lift amounts VL of the intake valves 30 are the specific lift amounts (VL1, VL2, VL3, ... VLn) are learned as the lift learned values (Gke1, Gke2, Gke3, ... Gken), respectively. FIG. 13 shows an example where the seven specific lift amounts VL1 to VL7 are set. When the lift amount VL is one of the multiple specific lift amounts VL1 to VL7, the lift learned value corresponding to the specific lift amount is calculated as the learned deviation value Gke. On the other hand, in the range where the lift amount VL is not any one of the multiple specific lift amounts VL1 to VL7 and the lift amount VL is smaller than the predetermined lift amount C, the learned deviation value Gke is calculated by linearly interpolating a value between the lift learned values corresponding to the specific lift amounts that sandwich the current lift amount VL based on the relationship between the current lift amount VL and the specific lift amounts that sandwich the current lift amount VL. In the range where the lift amount VL is larger than the specific lift amount VLn and smaller than the predetermined lift amount C, the learned deviation value Gke is calculated by linearly interpolating a value between the lift amount learned value Gken and "0" based on the relationship among the current lift amount VL, the specific lift amount VLn, and the predetermined lift amount C.

In the first embodiment of the invention, in the range where the lift amount VL is equal to or larger than the predetermined lift amount C, the deviation may be learned, the learned deviation value may be calculated, and the target injection amount Tq may be corrected based on the learned deviation value. With this configuration, the air-fuel ratio apparatus, with which an influence of the deviation of the actual passage area of the communication portion from the reference passage area may be exerted on the air-fuel ratio even in the range where the lift amount VL is large, can control the air-fuel ratio of the air-fuel mixture to a desired ratio. With this configuration, for example, the learned deviation value may be calculated in any one of the following manners (IV) and (V).

(IV). First, the learned small lift value Gksm is learned, and the deviation at the specific lift amount E is learned as the large lift learned value Gklg. The specific lift amount E is set to maximum lift amount that can be achieved by the variable lift control. When the lift amount VL is the specific lift amount A, the learned small lift value Gksm is calculated as the learned deviation value Gkf. When the lift amount VL is the specific lift amount E, the large lift learned value Gklg is calculated as the learned deviation value Gkf. In the range where the lift amount VL is neither the specific lift amount A nor the specific lift amount E, a value, which is interpolated between the learned small lift value Gksm and the large lift learned value Gklg based on the relationship among the current lift amount VL, the specific lift amount A, and the specific lift amount E and the conversion coefficient, is calculated as the learned deviation value Gkf. More specifically, the learned deviation value Gkf is calculated according to the following equation using the preset conversion coefficient K5. The conversion coefficient K5 is set to a positive value equal to or smaller than "1" based on the lift amount VL.

$$Gkf=Gklg+(Gksm-Gklg)(VL-E)K5/(A-E)$$

Figure 14:
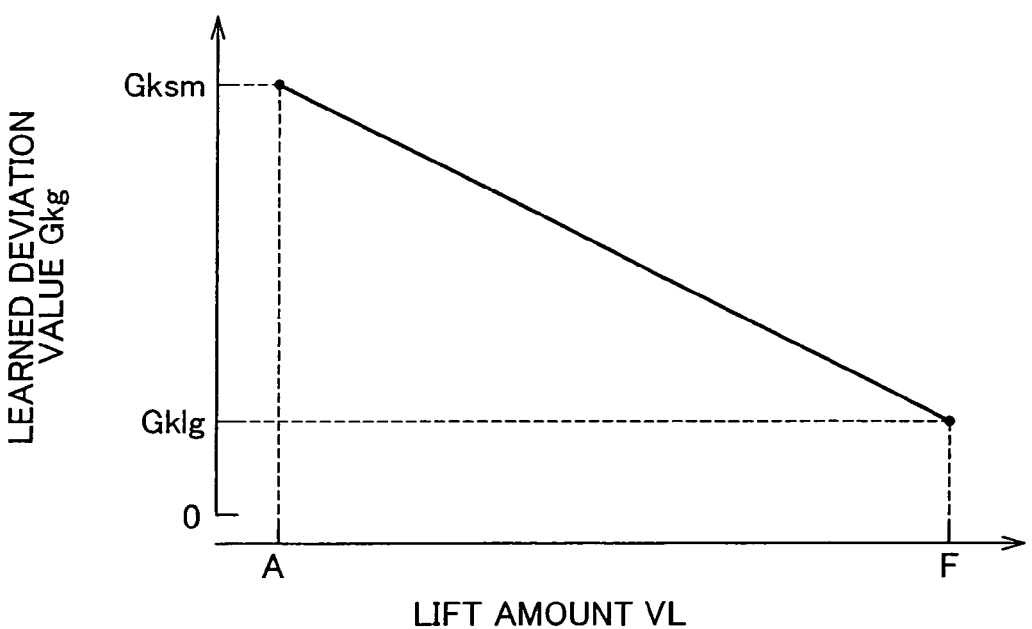
FIG. 14 is a graph showing the relationship between the lift amount of the intake valve and the learned deviation value according to another embodiment of the invention.

(V). FIG. 14 shows an example of the relationship between the lift amount VL of the intake valve 30 and the learned deviation value Gkg. As shown in FIG. 14, first, the learned small lift value Gksm and the large lift learned value Gklg are learned. When the lift amount VL is the specific lift amount A, the learned small lift value Gksm is calculated as the learned deviation value Gkf. When the lift amount VL is the specific lift amount E, the large lift learned value Gklg is calculated as the learned deviation value Gkf. On the other hand, in the range where the lift amount VL is neither the specific lift amount A nor the specific lift amount E, the learned deviation value Gkg is calculated by linearly interpolating a value between the learned small lift value Gksm and the large lift learned value Gklg based on the relationship among the lift amount VL, the specific lift amount A and the specific lift amount E.

The specific lift amount E may be set to a lift amount that differs from the maxim lift amount that can be achieved by the variable lift control. For example, the specific lift amount E may be set to a lift amount that is slightly smaller than the maximum lift amount that can be achieved by the variable lift control. In this case, in the range where the lift amount VL is larger than the specific lift amount E, the learned deviation value may be interpolated by the extrapolation method. In this case, in the range where the lift amount VL is larger than the specific lift amount E, the conversion coefficient K5 may be set to a positive value equal to or larger than "1".

In the first embodiment of the invention, the specific lift amount A may be set to a value different from the lift amount VL that is set while the internal combustion engine 10 is at idle.

In the first embodiment of the invention, the specific lift amount A may be set to a value different from the minimum lift amount that can be achieved by the variable lift control. For example, the specific lift amount A may be set to a lift amount slightly larger than the minimum lift amount that can be achieved by the variable lift control. In this case, in the range where the lift amount VL is smaller than the specific lift amount A, the learned deviation value may be interpolated by the extrapolation method. The conversion coefficient may be set to a positive value equal to or larger than "1".

In the first embodiment of the invention, a map that defines the relationship between the lift amount VL and the learned deviation value may be set in advance and the learned deviation value may be calculated based on the lift amount VL using the map, instead of calculating the learned deviation value by interpolating a value between the lift learned values based on the lift amount VL. In this case, the relationship between the deviation and the lift amount VL can be learned by correcting the relationship stored in the map based on the lift learned value.

In the second embodiment of the invention, three or more ranges, where the learned values are learned, may be set. Alternatively, only two, where the learned values are learned, may be set.

In the second embodiment of the invention, in the range where the lift amount VL is equal to or larger than the predetermined lift amount VLd, the learned values may be learned, the learned deviation value may be calculated, and the target injection amount Tq may be corrected based on the learned deviation value. In this configuration, multiple ranges where the learned values are learned may be set in the range where the lift amount VL is equal to or larger than the predetermined lift amount VLd. With such configuration, the apparatus, with which an influence of the deviation of the actual passage area of the communication portion and the reference passage area is exerted on the air-fuel ratio even in the range where the lift amount VL is large, can accurately control the air-fuel ratio of the air-fuel mixture to a desired ratio.

Each of the embodiments described above may be applied to the apparatus in which the target injection amount Tq is not corrected using the correction amount set based on the signal output from the air-fuel ratio sensor 62 and the target injection amount Tq is corrected based only on the correction amount set base on the signal output from the oxygen sensor 64. Also, each of the embodiments described above may be applied to the apparatus in which an air-fuel ratio sensor is provided instead of the oxygen sensor 64 and the target injection amount Tq is corrected using the correction amount that is set based on the signal output from the air-fuel ratio sensor.

The invention may be applied to an internal combustion engine having one, two, three, five, or more cylinders.

While the invention has been described with reference to embodiments thereof, it is to be understood that the invention is not limited to the embodiments or constructions. To the contrary, the invention is intended to cover various modifications and equivalent arrangements. In addition, while the various elements of the embodiments are shown in various combinations and configurations, which are exemplary, other combinations and configurations, including more, smaller or only a single element, are also within the spirit and scope of the invention.

What is claimed is:

1. An air-fuel ratio control apparatus for an internal combustion engine including a variable lift mechanism that changes a lift amount of an intake valve, the air-fuel ratio control apparatus comprising:

a first control unit that performs an air-fuel ratio control to correct a fuel injection amount command value using a correction amount that is set based on a value output from a sensor provided downstream of an exhaust gas purification catalyst in an exhaust passage of the internal combustion engine, which outputs a signal indicating an oxygen concentration in exhaust gas downstream of the exhaust gas purification catalyst; and a second control unit that learns a relationship between a deviation of the correction amount from a reference value and the lift amount, that calculates a learned deviation value based on the lift amount, using the learned relationship, and that corrects the fuel injection amount command value using the correction amount including the calculated learned deviation value, the second control unit learns the relationship, calculates the learned deviation value, and corrects the fuel injection amount command value using the learned deviation value, on the condition that the lift amount is smaller than a predetermined lift amount, and the second control unit sets, in advance, a linear function as the relationship; calculates the deviation, wherein the deviation is a first deviation which corresponds to a specific lift amount that is smaller than the predetermined lift amount; changes a slope of the function based on the calculated deviation; and learns the relationship indicated by the function having the changed slope.

2. The air-fuel ratio control apparatus according to claim 1, wherein
the learned deviation value calculated using the relationship increases as the lift amount decreases.

3. The air-fuel ratio control apparatus according to claim 1, wherein the specific lift amount is a minimum lift amount.

4. The air-fuel ratio control apparatus according to claim 1, wherein
the specific lift amount is a lift amount that is set when the internal combustion engine is at idle.

5. The air-fuel ratio control apparatus according to claim 1, wherein
the second control unit calculates, in addition to the first deviation which corresponds to the specific lift amount, a second deviation which corresponds to a lift amount different from the specific lift amount, and changes the slope of the function based on the first deviation and the second deviation.

6. The air-fuel ratio control apparatus according to claim 1, wherein
the deviation is the deviation of the correction amount from the reference value when the internal combustion engine is stably controlled.

7. An air-fuel ratio control apparatus for an internal combustion engine including a variable lift mechanism that changes a lift amount of an intake valve, the air-fuel ratio control apparatus comprising:
a first control unit that performs an air-fuel ratio control to correct a fuel injection amount command value using a correction amount that is set based on a value output from a sensor provided downstream of an exhaust gas purification catalyst in an exhaust passage of the internal combustion engine, which outputs a signal indicating an oxygen concentration in exhaust gas downstream of the exhaust gas purification catalyst; and
a second control unit that learns a relationship between a deviation of the correction amount from a reference value and the lift amount, that calculates a learned deviation value based on the lift amount, using the learned relationship, and that corrects the fuel injection amount command value using the correction amount including the calculated learned deviation value,
the second control unit respectively learns the deviations corresponding to respective two different specific lift amounts, and calculates the learned deviation value by interpolating a value between the independently learned deviations based on a relationship between the specific lift amounts and the lift amount.

8. The air-fuel ratio control apparatus according to claim 7, wherein the interpolation is performed using a predetermined conversion coefficient.

9. The air-fuel ratio control apparatus according to claim 7, wherein the interpolation is a linear interpolation.

10. The air-fuel ratio control apparatus according to claim 7, wherein
the learned deviation value calculated using the relationship increases as the lift amount decreases.

11. The air-fuel ratio control apparatus according to claim 7, wherein
the deviation is the deviation of the correction amount from the reference value when the internal combustion engine is stably controlled.

12. An air-fuel ratio control apparatus for an internal combustion engine including a variable lift mechanism that changes a lift amount of an intake valve, the air-fuel ratio control apparatus comprising:
a first control unit that performs an air-fuel ratio control to correct a fuel injection amount command value using a correction amount that is set based on a value output from a sensor provided downstream of an exhaust gas purification catalyst in an exhaust passage of the internal combustion engine, which outputs a signal indicating an oxygen concentration in exhaust gas downstream of the exhaust gas purification catalyst; and
a second control unit that learns a relationship between a deviation of the correction amount from a reference value and the lift amount, that calculates a learned deviation value based on the lift amount, using the learned relationship, and that corrects the fuel injection amount command value using the correction amount including the calculated learned deviation value,
the second control unit sets multiple ranges for the lift amount, learns the relationship by learning the deviations corresponding to the respective ranges, selects one of the multiple ranges based on the lift amount, and calculates a learned value corresponding to the selected range as the learned deviation value.

13. The air-fuel ratio control apparatus according to claim 12, wherein
the learned deviation value calculated using the relationship increases as the lift amount decreases.

14. The air-fuel ratio control apparatus according to claim 12, wherein
the deviation is the deviation of the correction amount from the reference value when the internal combustion engine is stably controlled.

15. An air-fuel ratio control apparatus for an internal combustion engine including a variable lift mechanism that changes a lift amount of an intake valve, the air-fuel ratio control apparatus comprising:
a first control unit that performs an air-fuel ratio control to correct a fuel injection amount command value using a correction amount that is set based on a value output from a sensor provided downstream of an exhaust gas purification catalyst in an exhaust passage of the internal combustion engine, which outputs a signal indicating an oxygen concentration in exhaust gas downstream of the exhaust gas purification catalyst;
a second control unit that learns a relationship between a deviation of the correction amount from a reference value and the lift amount, that calculates a learned deviation value based on the lift amount, using the learned relationship, and that corrects the fuel injection amount command value using the correction amount including the calculated learned deviation value; and a sensor being provided upstream of the exhaust gas purification catalyst in the exhaust passage of the internal combustion engine, the sensor outputs a signal indicating an oxygen concentration in exhaust gas upstream of the exhaust gas purification catalyst, the second control unit performs the air-fuel ratio control, at predetermined intervals, to correct the fuel injection amount command value based on a value output from the sensor provided upstream of the exhaust gas purification catalyst, and the fuel injection amount command value is corrected by a correction amount, which is increased or decreased by a predetermined amount, based on a result of comparison between the value output from the sensor provided downstream of the exhaust gas purification catalyst and a reference value.

16. The air-fuel ratio control apparatus according to claim 15, wherein the internal combustion engine includes multiple cylinders, and the sensor provided upstream of the exhaust gas purification catalyst is shared by all the cylinders.

17. The air-fuel ratio control apparatus according to claim 16, wherein a number of the sensor provided upstream of the exhaust gas purification catalyst is one.

18. The air-fuel ratio control apparatus according to claim 15, wherein the learned deviation value calculated using the relationship increases as the lift amount decreases.

19. The air-fuel ratio control apparatus according to claim 15, wherein the deviation is a deviation of the correction amount from the reference value when the internal combustion engine is stably controlled.

* * * * *